United States Patent
Shinagawa et al.

(10) Patent No.: US 11,876,575 B2
(45) Date of Patent: Jan. 16, 2024

(54) ELECTRIC FIELD COMMUNICATION SYSTEM

(71) Applicants: NEXTY Electronics Corporation, Tokyo (JP); HOSEI UNIVERSITY, Tokyo (JP)

(72) Inventors: Mitsuru Shinagawa, Tokyo (JP); Kohei Hamamura, Tokyo (JP); Hiroshi Nakamura, Tokyo (JP); Naohiro Shimizu, Tokyo (JP)

(73) Assignees: NEXTY ELECTRONICS CORPORATION, Tokyo (JP); HOSEI UNIVERSITY, Tokyo (JP)

( * ) Notice: Subject to any disclaimer, the term of this patent is extended or adjusted under 35 U.S.C. 154(b) by 41 days.

(21) Appl. No.: 17/623,840

(22) PCT Filed: Jun. 30, 2020

(86) PCT No.: PCT/JP2020/025606
§ 371 (c)(1),
(2) Date: Dec. 29, 2021

(87) PCT Pub. No.: WO2021/002341
PCT Pub. Date: Jan. 7, 2021

(65) Prior Publication Data
US 2022/0255586 A1 Aug. 11, 2022

(30) Foreign Application Priority Data
Jul. 1, 2019 (JP) .................................. 2019-122753

(51) Int. Cl.
*H04B 5/00* (2006.01)
*H04B 13/00* (2006.01)
*H04B 5/02* (2006.01)

(52) U.S. Cl.
CPC ......... *H04B 5/0031* (2013.01); *H04B 5/0043* (2013.01); *H04B 5/02* (2013.01)

(58) Field of Classification Search
None
See application file for complete search history.

(56) References Cited

U.S. PATENT DOCUMENTS 7,801,483 B2 * 9/2010 Minotani ............. H04B 13/005
455/100
8,175,527 B2 * 5/2012 Hebiguchi ........... H04B 13/005
455/100

(Continued)

FOREIGN PATENT DOCUMENTS

CN 106968289 A 7/2017
JP 2006-324774 A 11/2006

(Continued)

OTHER PUBLICATIONS

ISR of PCT/JP2020/025606 dated Sep. 29, 2020.
EESR of EP20834660.1 dated Jun. 28, 2023 (7 pages).

*Primary Examiner* — Tuan A Tran
(74) *Attorney, Agent, or Firm* — WORKMAN NYDEGGER

(57) ABSTRACT

Electric field communication that adopts a metal as a communication medium is performed. An electric field communication system communicating through an electric field, includes: a communication medium made of a material capable of transmitting the electric field; a first transmitter that generates an electric field dependent on a potential difference between a first electrode, which is disposed on a side of the communication medium and is connected to the communication medium via a coupling capacitance, and a second electrode connected to an earth ground via a coupling capacitance, with the first electrode being connected on a signal side of the transmitter, and the second electrode (Continued)

being connected on a ground side of the transmitter; and a first receiver disposed in contact with the communication medium, wherein the first transmitter and the first receiver communicate with each other through the electric field via the communication medium.

17 Claims, 22 Drawing Sheets

(56) References Cited

U.S. PATENT DOCUMENTS

| | | | | |
|---|---|---|---|---|
| 8,180,288 | B2* | 5/2012 | Hebiguchi | H04B 13/005 |
| | | | | 455/41.1 |
| 8,208,852 | B2* | 6/2012 | Hebiguchi | H04B 13/005 |
| | | | | 340/854.8 |
| 8,866,760 | B2* | 10/2014 | Corroy | H04B 13/005 |
| | | | | 345/173 |
| 9,838,088 | B2* | 12/2017 | Pernisek | H04B 13/005 |
| 9,871,563 | B2* | 1/2018 | Pernisek | H04B 13/005 |
| 9,941,981 | B2* | 4/2018 | Linnartz | H04B 5/0012 |
| 2001/0008377 | A1 | 7/2001 | Takada | |
| 2008/0261523 | A1 | 10/2008 | Kubono et al. | |
| 2018/0262222 | A1 | 9/2018 | Uno et al. | |

FOREIGN PATENT DOCUMENTS

| | | |
|---|---|---|
| JP | 2009-213062 A | 9/2009 |
| JP | 2011-130335 A | 6/2011 |
| JP | 2014-157406 A | 8/2014 |
| JP | 2019-153924 A | 9/2019 |
| JP | 2020-049982 A | 4/2020 |
| WO | 2017-057045 A1 | 4/2017 |

* cited by examiner

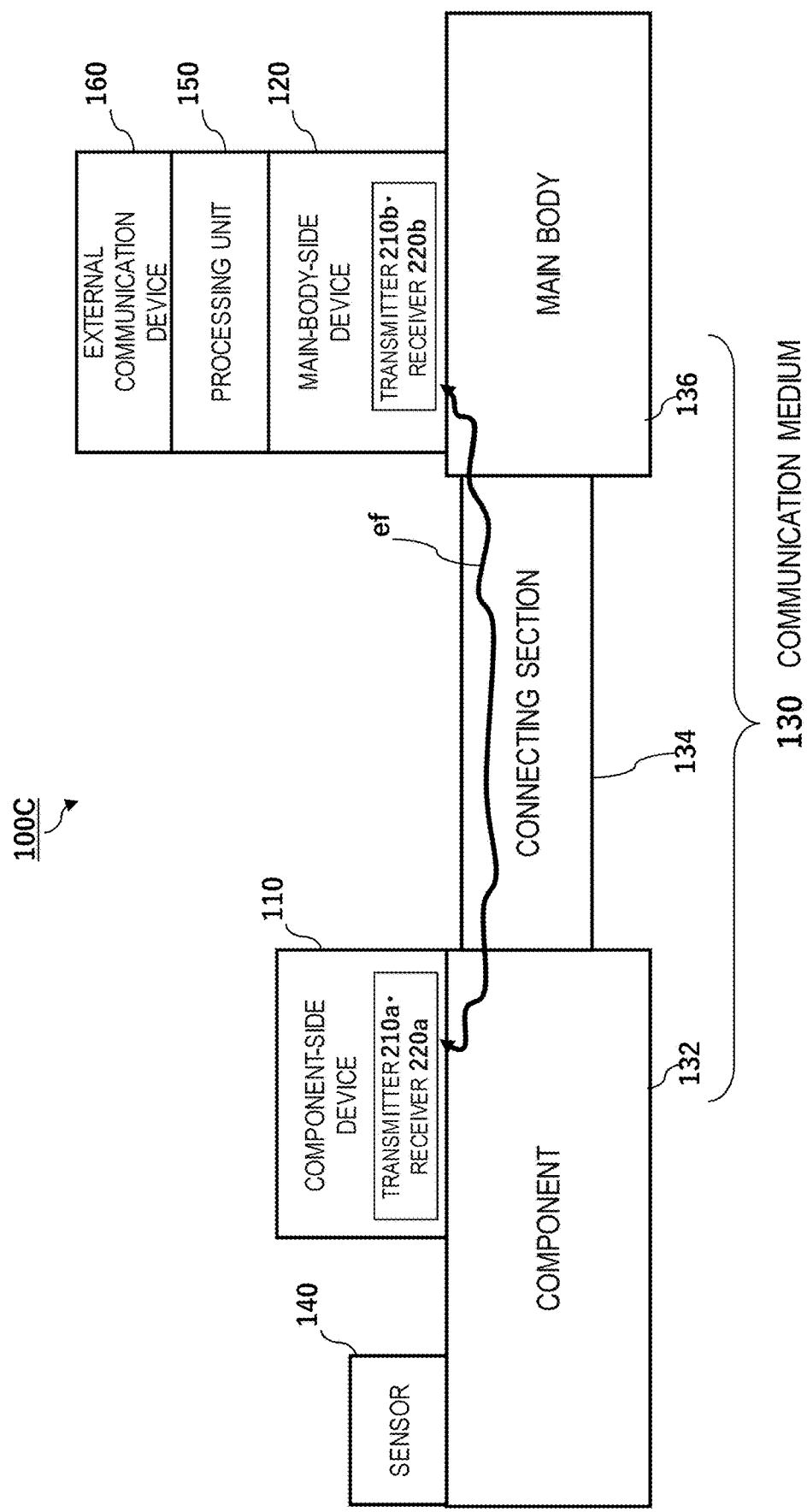

Fig. 2
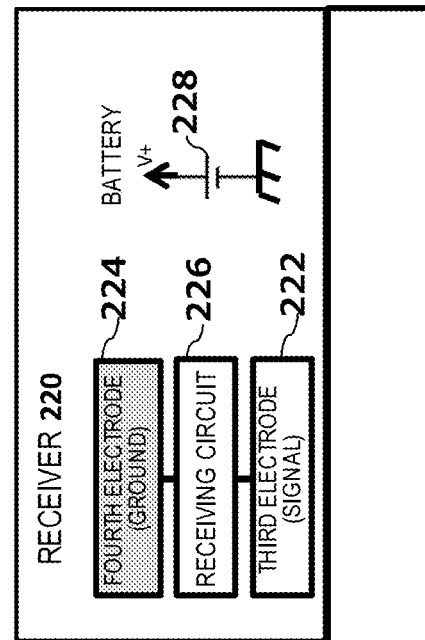
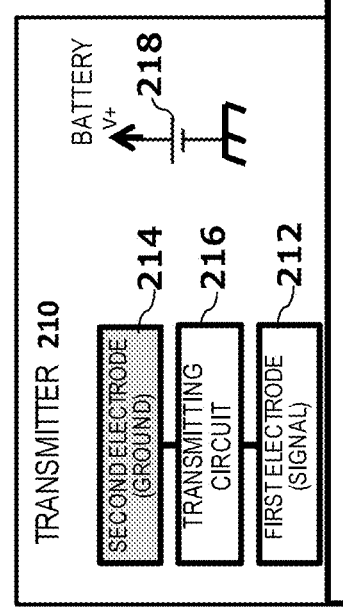

OUTPUT OF TRANSMITTER

SIGNAL ENTERING SIGNAL ELECTRODE

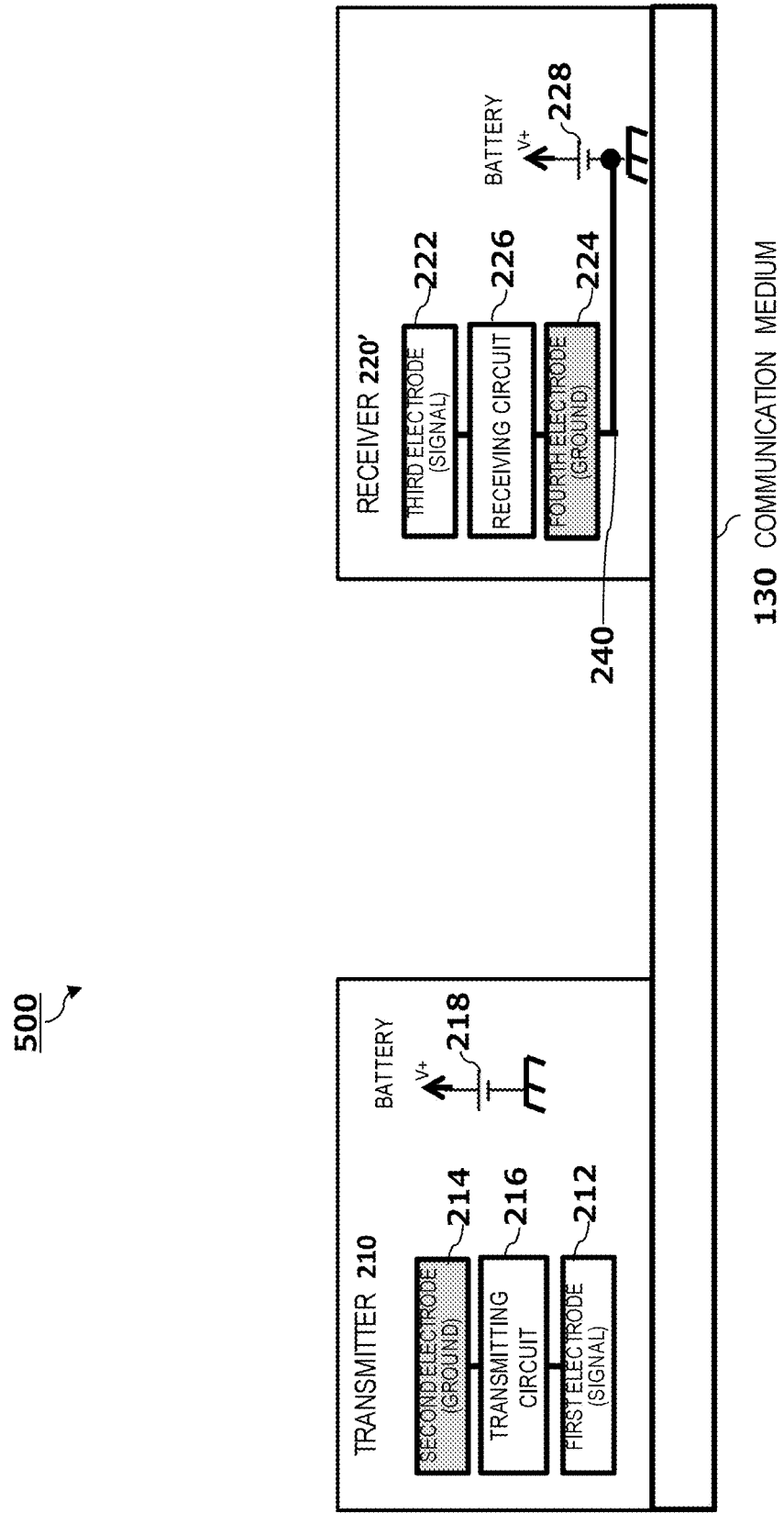

SIGNAL ENTERING SIGNAL
ELECTRODE DECREASES

ELECTRIC FIELD COMMUNICATION SYSTEM

TECHNICAL FIELD

This disclosure relates to a system that communicates using the change of an electric field.

BACKGROUND ART

In recent years, operations using any of various operation apparatuses, such as power shovels, require that the state of a component or the like detachably attached to a distal end of an arm is monitored via a communication network, and the operation situations of the operation apparatus are appropriately monitored.

SUMMARY OF INVENTION

Technical Problem

In a case of collecting a signal from a sensor via a wireless network, the signal from the sensor can be received even if the component or the like to which the sensor is attached is apart from a main-body-side monitoring device that monitors the situations of the component or the like. Accordingly, the attachment and removal of the component cannot be detected. In a case where multiple operation apparatuses operate in a range where a wireless network is reachable, the monitoring device collects signals from all sensors related to the operation apparatuses in this range. As a result, a signal from a sensor attached to a component attached to the distal end of an arm that is an intended opposite party of communication, and a signal from a sensor attached to another component cannot be securely discriminated from each other on the basis of the intensities itself of the signals.

In a case of collecting a signal from a sensor via a wired network, the attachment and removal of a component can be securely detected. However, a cable for communication of the signal of the sensor, and a connector for coupling the cable to the component or the like are required to be provided. The cable and the connector are prone to be broken during an operation of an operation apparatus. In case the cable or the connector is broken, the signal from the sensor cannot be collected.

This disclosure has been made in view of the above points, and has an object to provide a system and a method that perform electric field communication using an electric field induced in a metal or the like included in the operation apparatus.

Solution to Problem

This technique has been made in view of the problems described above. An aspect of this disclosure is an electric field communication system communicating through an electric field, includes: a communication medium made of a material capable of transmitting the electric field; a first transmitter that generates an electric field dependent on a potential difference between a first electrode, which is disposed on a side of the communication medium and is connected to the communication medium via a coupling capacitance, and a second electrode connected to an earth ground via a coupling capacitance, with the first electrode being connected on a signal side of the transmitter, and the second electrode being connected on a ground side of the transmitter; and a first receiver disposed in contact with the communication medium, wherein the first transmitter and the first receiver communicate with each other through the electric field via the communication medium.

BRIEF DESCRIPTION OF DRAWINGS

FIG. 1C is an overall configuration diagram of the electric field communication system according to one embodiment of this disclosure.

FIG. 2 schematically shows an electric field communication system according to a first embodiment of this disclosure.

FIG. 5 schematically shows an electric field communication system according to a second embodiment of this disclosure.

DESCRIPTION OF EMBODIMENTS

[Description of Embodiments of this Disclosure]

Figure 1A:
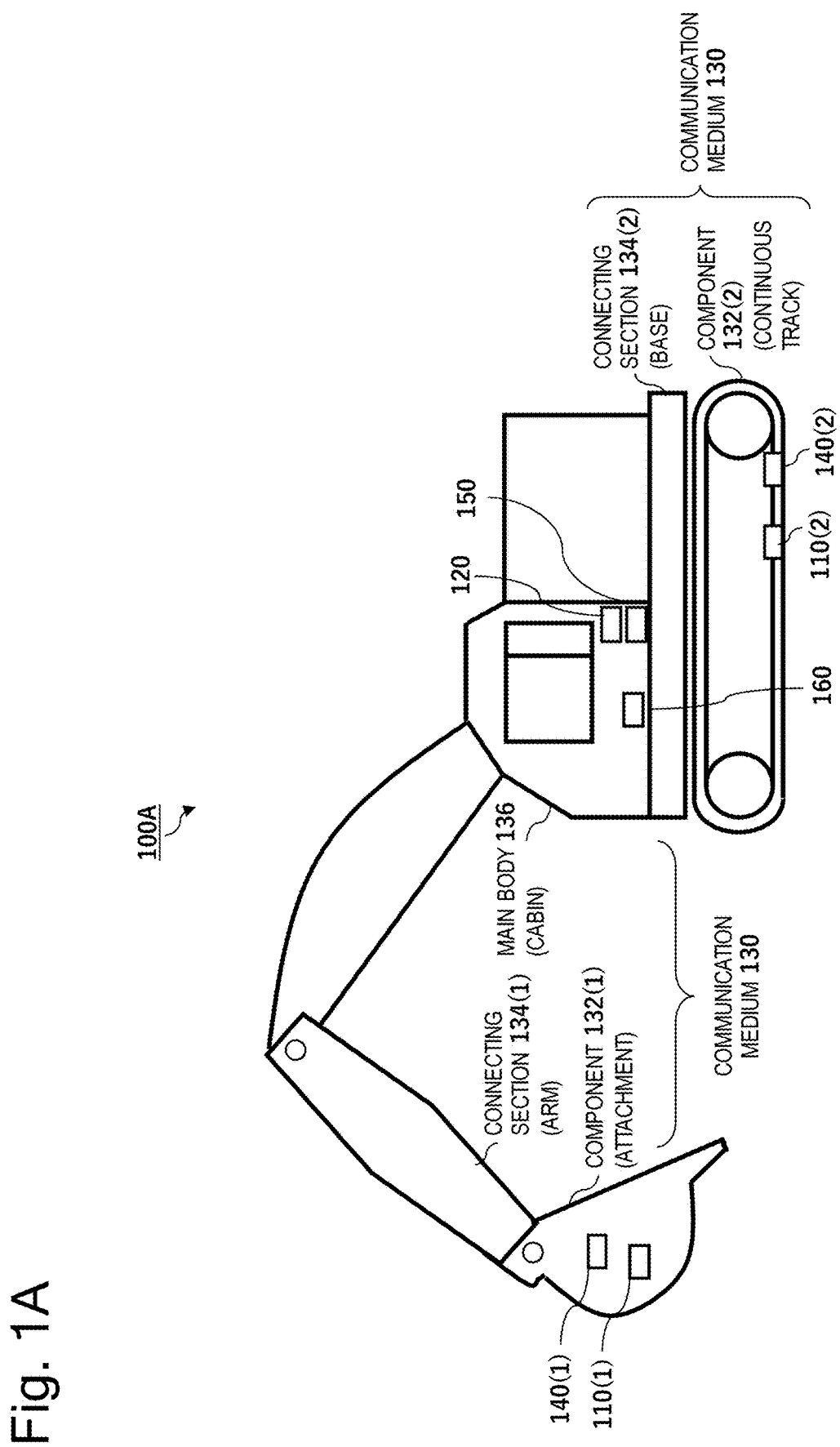
FIG. 1A schematically shows an electric field communication system according to one embodiment of this disclosure.

First, the details of embodiments of this disclosure are listed and described. One embodiment of this disclosure includes the following configuration.

(Item 1) Item 1 provides an electric field communication system communicating through an electric field, including:
a communication medium made of a material capable of transmitting the electric field;
a first transmitter that generates an electric field dependent on a potential difference between a first electrode, which is disposed on a side of the communication medium and is connected to the communication medium via a coupling capacitance, and a second electrode connected to an earth ground via a coupling capacitance, with the first electrode being connected on a signal side of the transmitter, and the second electrode being connected on a ground side of the transmitter; and
a first receiver disposed in contact with the communication medium,
wherein the first transmitter and the first receiver communicate with each other through the electric field via the communication medium.

(Item 2) Item 2 provides the electric field communication system according to Item 1,
wherein the communication medium includes:
a component in contact with the first transmitter; and
a main body in contact with the first receiver, and
the electric field communication system further includes
a processing unit that detects that the component is detached from the main body when an intensity of a signal generated based on the electric field transmitted from the first transmitter is less than a threshold.

(Item 3) Item 3 provides the electric field communication system according to Item 2,
wherein the first receiver includes:
a third electrode connected to the earth ground via a coupling capacitance;
a fourth electrode disposed on a side of the communication medium; and
a receiving circuit, the third electrode being connected on the signal side of the receiving circuit, the fourth electrode being connected on a ground side of the receiving circuit, and
the receiving circuit outputs a signal dependent on a potential difference between the third electrode and the fourth electrode generated by the electric field transmitted from the transmitter.

(Item 4) Item 4 provides the electric field communication system according to Item 2,
wherein the first receiver is disposed between and in contact with the earth ground and the communication medium, and
the first receiver includes:
a third electrode that is disposed on a side of the communication medium, and is connected to the communication medium via capacitance coupling; and
a fourth electrode that is disposed on a side of the earth ground, and is connected to the earth ground via capacitance coupling.

(Item 5) Item 5 provides the electric field communication system according to Item 2 or Item 4,
wherein the first transmitter is disposed between and in contact with the earth ground and the communication medium, and
the second electrode of the first transmitter is disposed on a side of the earth ground.

(Item 6) Item 6 provides the electric field communication system according to any one of Items 3 to 5, further including
a sensor that detects a state of the component of the communication medium with which the first transmitter is in contact, or a surrounding environment of the component, and the first transmitter outputs a signal dependent on an output signal from the sensor, as a voltage temporally changing between the first electrode and the second electrode.

(Item 7) Item 7 provides the electric field communication system according to Item 6, wherein the sensor is a sensor that detects movement of the component, and the processing unit calculates an operating time period of the component, based on the movement of the component detected by the sensor.

(Item 8) Item 8 provides the electric field communication system according to Item 6, wherein the sensor is a sensor that detects a surrounding environment of the component, and the processing unit detects whether the component is in an appropriate operating environment, based on the surrounding environment of the component detected by the sensor.

[Details of Embodiments of This Disclosure]

Hereinafter, embodiments of this disclosure are described with reference to the drawings. In the drawings, the same or similar elements are assigned the same or similar reference signs. In the description of each embodiment, redundant description about the same or similar elements is sometimes omitted. Characteristics represented in each embodiment are applicable to the other embodiments only if no contradiction occurs. However, the embodiments of this disclosure are not necessarily limited to such aspects. It is obvious for those skilled in the art that the embodiments of this disclosure can be implemented in various modes included in a range defined by the claims.

FIG. 1A is an overall configuration diagram of an electric field communication system 100A according to one embodiment of this disclosure. The electric field communication system 100A is a system applicable to various operation apparatuses, for example, a power shovel, a robot arm and the like; the operation apparatuses include a main body 136, a component 132 (an attachment 132(1) and a continuous track 132(2) in FIG. 1A; hereinafter, sometimes collectively called a component 132) that can be attached to or detached from the main body 136. The electric field communication system 100A mainly includes component-side devices 110 (110(1) and 110(2) in FIG. 1A), a main-body-side device 120, and a communication medium 130 that transmits an electric field. The electric field communication system 100A communicates through an electric field of induced in the communication medium 130 between the component-side device 110 provided for the component 132, and the main-body-side device 120 provided for the main body 136. Hereinafter, a case is exemplified where the electric field communication system 100A is applied to a power shovel. Referring to FIG. 1A, the structure of the electric field communication system 100A according to this disclosure is overviewed. The power shovel exemplified in FIG. 1A mainly includes a detachable and attachable attachment 132(1) that is a component 132, a cabin which is a main body 136 and in which an operator climbs aboard, and an arm 134(1) that is a connecting section 134.

The components 132 include portions with which the component-side devices 110 communicating with the main-body-side device 120 are in physical contact. For the component 132, for example, the environment around the component (e.g., humidity, and temperature), and the state of the component itself (temperature, acceleration, on/off, etc.) are required to be detected. In the power shovel, the components 132 includes the attachment 132(1) attached to the distal end of the operation apparatus, the continuous track 132(2) of the power shovel that is a controlled device that is controlled by the main body 136, and various filters, such as an engine filter and an oil filter, for example. The component 132 is configured to be detachable from and attachable to the main body 136 via the connecting section 134. The component 132 may be a periodic replacement component or an expendable item. Note that in this disclosure, a state where two elements being "in physical contact" indicates that the two elements are in contact to a certain degree allowing an electric field to be transmitted between these elements. In actuality, a dielectric is sometimes present between the two elements that are in contact with each other. For example, a housing wall that is of the component-side devices 110 and is made of a dielectric, such as a plastic, may reside between the attachment, which is the component 132 of the power shovel, and the component-side device 110.

The connecting sections 134 (the arm 134(1) and the base portion 134(2) in FIG. 1A; hereinafter, sometimes collectively called the connecting section 134) are members connected between the components 132 and the main body 136. One is in physical contact with the component 132, and the other is in physical contact with the main body 136. For example, in a case where the component 132 is the attachment 132(1) of the power shovel, the connecting section 134 is the arm 134(1) of the power shovel. In a case where the component 132 is the continuous track 132(2) of the power shovel, and the connecting section 134 is the base portion 134(2) of the power shovel. As described above, the component 132 and the connecting section 134 are only required to be in physical contact. For example, a lubricant that is a dielectric may reside between the attachment, which is the component 132 of the power shovel, and the arm, which is the connecting section 134.

The main body 136 includes portions with which the main-body-side device 120 communicating with the component-side devices 110 is in physical contact. The main body 136 is, for example, a cabin in which the operator operating the power shovel is aboard.

The communication medium 130 is portions made of a material, for example, a conductor or a dielectric, which transmits an electric field, in the component 132, the connecting section 134 that connects the component 132 and the main body 136, and the main body 136. For example, the communication medium 130 is made of a conductor typified by a metal (e.g., iron, aluminum, copper, etc.). For example, the main body 136 of the power shovel includes a frame of the power shovel, windows, and a seat for an operator, among which the frame made of a material, such as a metal, allowing an electric field to be transmitted serves as the communication medium 130. The portions of the communication medium 130 (the component 132, the connecting section 134, and the main body 136) may be made of different types of materials capable of transmitting the electric field, or be made of the same type of material capable of transmitting the electric field. Each of the component 132, the connecting section 134, and the main body 136 shown in FIG. 1A may be made up of one or more elements. According to this disclosure, physical contact between the component-side devices 110 and the component 132, between the component 132 and the connecting section 134, between the connecting section 134 and the main body 136, and between the main body 136 and the main-body-side device 120 constructs a network for electric field communication. Accordingly, if the individual portions are not in physical contact, no communication is established between the main-body-side device 120 and the component-side devices 110. Consequently, even if multiple operation apparatuses or the like are in operation in a narrow range, communication with an opposite party without physical contact is not made. Note that the components 132, the connecting section 134, and the main body 136, which constitute the communication medium 130, may have various shapes.

The electric field communication system 100 may include not only the component-side devices 110, the main-body-side device 120 and the communication medium 130 (the components 132, the connecting section 134, and the main body 136) described above, but also sensors 140 (two sensors 140(1) and 140(2) in FIG. 1A), and a processing unit 150 and an external communication device 160. These are described in detail with reference to FIG. 1B.

Note that as shown in FIG. 1A, for the single main body 136, the multiple components 132 (the attachment 132(1) and the continuous track 132(2) in FIG. 1A), the multiple component-side devices 110 (two component-side devices 110(1) and 110(2) in FIG. 1A) and the multiple sensors 140 (two sensors 140(1) and 140(2) in FIG. 1A) may be provided. The component-side devices 110 (110(1) and 110(2) in FIG. 1A) are respectively assigned individual identification numbers, and the correspondence relationships between the component-side devices 110, the components 132 and the sensors 140 are preliminarily configured. Accordingly, the main-body-side device 120 can communicate in a discriminated manner with respect to the components 132 and the sensors 140 corresponding to the respective component-side devices 110, for example, the sensor 140(1) and the component 132(1) corresponding to the component-side device 110(1).

Figure 1B:
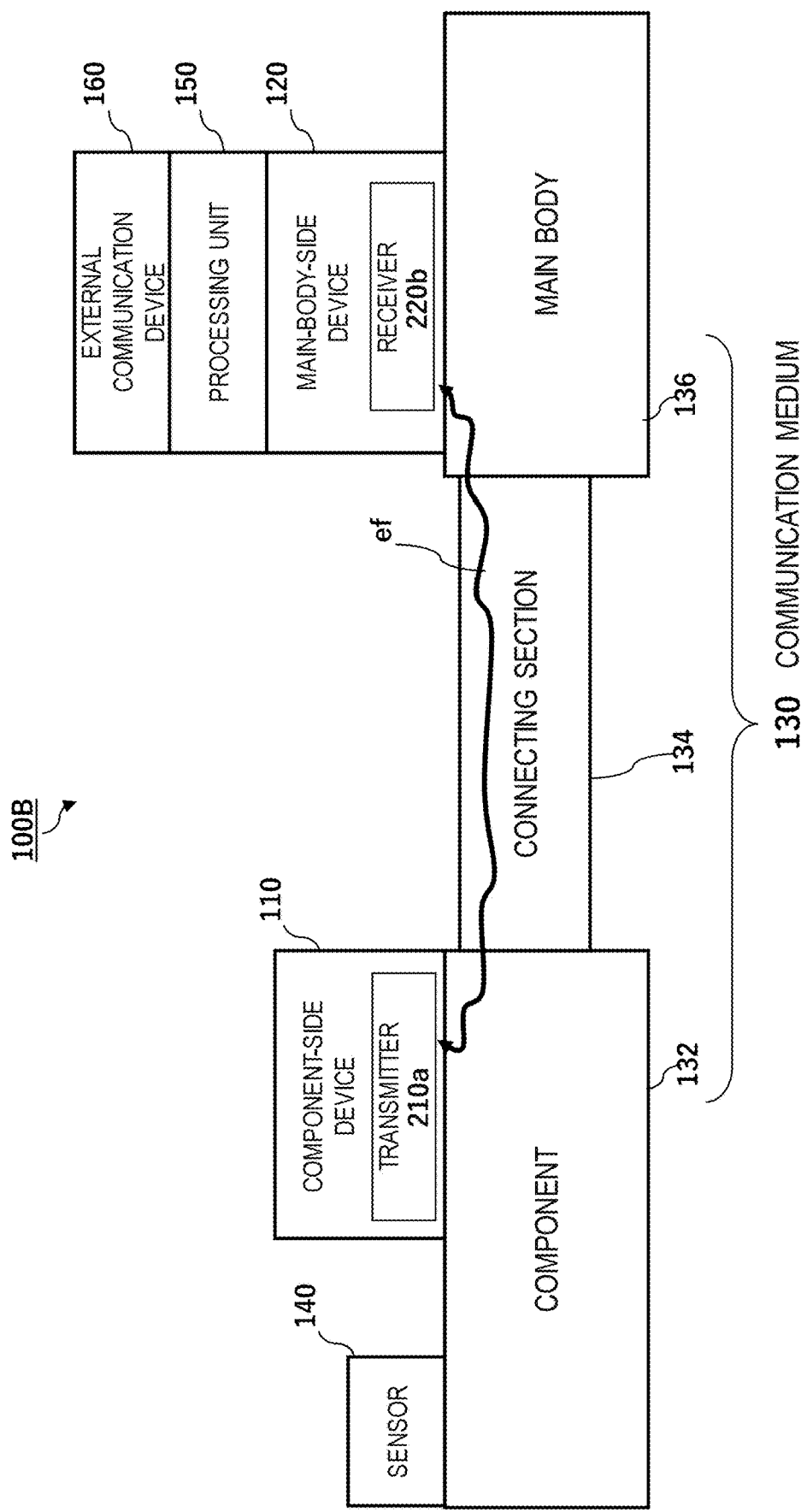
FIG. 1B is an overall configuration diagram of the electric field communication system according to one embodiment of this disclosure.

FIG. 1B is an overall configuration diagram of an electric field communication system 100B according to the one embodiment of this disclosure. Similar to the electric field communication system 100A shown in FIG. 1A, the electric field communication system 100B mainly includes component-side devices 110, a main-body-side device 120, and a communication medium 130 that transmits an electric field. The electric field communication system 100B in FIG. 1B is different from the electric field communication system 100A shown in FIG. 1A in that each component-side device 110 includes a transmitter 210a, and the main-body-side device 120 includes a receiver 220b. FIG. 1B exemplifies the electric field ef that propagates in the communication medium 130. The electric field ef propagates using portions made of a material capable of transmitting the electric field, for example, portions made of a metal, in the components 132, the connecting section 134 and the main body 136, as the communication medium 130.

The component-side device 110 includes the transmitter 210a that transmits a signal to the receiver 220b of the main-body-side device 120. The transmitter 210a on the component side transmits, for example, an identification signal assigned to each transmitter 210a, and an output signal received from the sensor 140, to the receiver 220b. Based on the individual identification numbers assigned to the transmitters 210a on the component side, the transmitters 210a can be uniquely identified.

The main-body-side device 120 includes the receiver 220b that is disposed at a position apart from the transmitter 210a, and receives a signal from the transmitter 210a of the component-side device 110. During electric field communication, the receiver 220b may be disposed in the electric field caused by the transmitter 210a.

According to this disclosure, by disposing the receiver 220b in the electric field caused by the transmitter 210a and by bringing the receiver 220b and the transmitter 210a into contact with the communication medium 130, a material capable of transmitting the electric field of the operation apparatus, for example, a portion made of a metal is adopted as the communication medium 130, and a communication network or the like is established. Accordingly, a wired facility including a cable and the like, and a wireless facility including an antenna are not required to be provided. The wired facility is not required, which resultantly negates the need of a heavy cable. For example, the improvement of the fuel consumption per operating time period of the power shovel can be facilitated. The need of the cable that is cumbersome for operation is negated, which can facilitate improvement in operation efficiency.

Furthermore, according to this disclosure, the intensity of the signal transmitted from the transmitter 210a is detected by the receiver 220b, which allows detection of the attachment and removal state of the component 132 or the like without separately providing a device for monitoring the attachment and removal of the component 132. For example, when the intensity of the signal received by the receiver 220b is less than a threshold, it can be determined that the component 132 is apart from the connecting section 134.

Returning to FIG. 1B, the sensors 140, the processing unit 150, and the external communication device 160 are described. The sensors 140 are sensors that detect various physical quantities indicating the states of the components 132, for example, sensors that detect the movements of the components (vibration sensors, acceleration sensors, angular rate sensors, etc.), sensors that measure the environments of the components 132 (temperature sensors that measure the temperatures of the components 132, and humidity sensors that measure the humidity of the surrounding environments of the components 132), or a combination thereof. Upon detection of the state of the component 132, the sensor 140 transmits an output signal indicating the state, to the component-side device 110. Note that for a single component 132, multiple sensors 140 (e.g., three sensors that are a temperature sensor, a humidity sensor, and a barometric sensor) may be arranged. Output signals from these multiple sensors are transmitted to the component-side devices 110, together with the identification numbers and the like assigned to the respective sensors 140. The component-side devices 110 transmit the identification numbers of the sensors and the output signals from the multiple sensors, to the main-body-side device 120 via the communication medium 130.

The processing unit 150 includes a processor (not shown) and a memory (not shown), as main configuration elements. The processing unit 150 causes the processor to appropriately process data obtained from the main-body-side device 120, and stores the processed data in the memory. Furthermore, the processing unit 150 can output the data and the like stored in the memory, to the external communication device 160 and the main-body-side device 120. Note that in the illustrated example, the processing unit 150 is disposed above the main-body-side device 120. However, there is no limitation thereto. The processing unit 150 is only required to be communicably connected to the main-body-side device 120 and the external communication device 160.

The processing unit 150 can detect whether the component 132 is detached from the connecting section 134 or not. The processing unit 150 determines that the component is detached from the connecting section 134, when the intensity of the signal generated from the potential difference caused based on the electric field transmitted from the transmitter 210a of the component-side device 110 and received by the receiver 220b of the main-body-side device 120 is less than a threshold or is substantially zero.

Furthermore, the processing unit 150 can calculate the situations of the components 132 in a state of being connected to the main body 136, for example, the operating time period, using data from the various sensors 140 obtained from the main-body-side device 120, and the identification numbers assigned to the transmitter 210a on the component side.

More specifically, the processing unit 150 obtains the identification signal assigned to the transmitter 210a for the component 132 attached to the main body 136, and obtains the output signal from the sensor 140 that detects the movement of the component 132. The processing unit 150 can accumulate time periods during which the output signal obtained from the sensor 140 is equal to or more than the threshold, and calculate the operating time period of the component in a state where the component 132 is attached, from the accumulated time period. Accordingly, if the operating time period exceeds a prescribed time period, the processing unit 150 can notify the operator or the like controlling the component 132, by issuing an alarm sound or indication that prompts them to maintain the component 132 or repair the component 132.

The processing unit 150 can grasp the operating environment in the state where the components 132 are attached to the main body 136, on the basis of the output signals from the sensors 140 (e.g., a temperature sensor, a humidity sensor) that detect the surrounding environments of the components 132, and the identification signal of the transmitter 210a. Accordingly, the processing unit 150 can determine and monitor whether the operations are performed by the components 132 in appropriate operating environments (e.g., appropriate temperatures, and appropriate humidity). When the operating environment for the operation by the component is not appropriate, the processing unit 150 can notify the operator or the like that the component 132 is not in an appropriate operating environment, through an alarm sound and indication.

The external communication device 160 is a device that transmits the operation situations and the like of each component obtained by the processing unit 150 to an external computer (not shown) via a network, such as the Internet. An external administrator can collectively manage the operation situations of the components 132 on the basis of information received by the external computer from the external communication device 160. Accordingly, for example, the external administrator can place orders of replacement components at appropriate timing, without going to the site where the operation apparatus is in operation and periodically inspecting the operation apparatus. Note that in the illustrated example, the external communication device 160 is disposed above the processing unit 150. However, there is no limitation thereto. The processing unit 150 is only required to be communicably connected to the processing unit 150 and the external computer (not shown).

According to this disclosure, based on the various physical quantities indicating the states of the components 132 obtained from the sensors 140, the processing unit 150 can obtain the operation situations of the components, and notify the operator, or the external communication device 160 can notify the external administrator. Accordingly, the operator or the external administrator can grasp the operation situations of the components 132 in the states of being in contact with the main body 136, and appropriately manage the components 132. As a result, malfunctions due to abnormal wear and overload of the components can be reduced, and the safety of operation can be improved, and the efficiency of operation can be facilitated to be improved.

Note that the combination of the component 132, the connecting section 134, and the main body 136 is applicable to various types of operation apparatuses. The electric field communication system 100B is applicable not only to the power shovel (FIG. 1A) described above, but also to other construction machines (bulldozers, mobile cranes, road rollers, etc.), vehicles, trains, robot arms, tools, medical devices (scalpels, forceps, etc.).

For example, when the electric field communication system 100B in this disclosure is applied to a vehicle, the components 132 are wheels for tires, doors and the like, the connecting sections 134 are the frame and the like constituting the vehicle body, and the main body 136 is a controller of the vehicle. Note that in this example, the components 132, the connecting sections 134, and the main body 136 are separately configured. Alternatively, the components 132 and the connecting sections 134 may be integrally configured. In this case, a single component 132' is physically in contact with the main body 136. For example, in a case where the electric field communication system 100 in this disclosure is applied to a vehicle, the components 132' may be doors of the vehicle, the main body 136 may be the controller of the vehicle. The component 132' is provided with sensors 140 for switches of power windows, and a transmitter 210a that transmits signals from the sensors 140. In the main body 136, the controller is provided with the receiver 220b that receives a signal from the transmitter 210a. Accordingly, when the sensor 140 detects instructions of raising and lowering the power windows, output signals from the sensors 140 can be transmitted to the controller of the vehicle through electric field communication. Alternatively, the component-side devices 110 and the main-body-side device 120 may be disposed on a single main body 136' where the component 132, the connecting section 134 and the main body 136 are integrated.

For example, in a case where the electric field communication system 100 in this disclosure is applied to a robot arm, the component 132 is a distal-end tool, such as a robot hand, attached to the distal end of the robot arm, the connecting section 134 is the robot arm, and the main body 136 is a base for the robot arm.

Furthermore, for example, in a case where the electric field communication system 100 in this disclosure is applied to an electric tool, the component 132 is an attachment attached to the distal end of the arm of the tool, the connecting section 134 is the arm of the tool, and the main body 136 is the main body of the tool.

FIG. 1C is an overall configuration diagram of the electric field communication system 100C according to one embodiment of this disclosure. The electric field communication system 100C is different from the electric field communication system 100B shown in FIG. 1B in that the component-side device 110 includes a receiver 220a in addition to the transmitter 210a, and the main-body-side device 120 includes a transmitter 210b in addition to the receiver 220b. Hereinafter, the description of the configuration elements having already been described with reference to FIG. 1B is omitted.

The receiver 220a of the component-side devices 110 receives a signal from the transmitter 210b of the main-body-side device 120. For example, the receiver 220a on the component side receives a signal for controlling the component 132 transmitted from the transmitter 210b, for example, a signal of requesting the sensor 140 to transmit sensor information.

The transmitter 210b of the main-body-side device 120 transmits a signal to the receiver 220a of the component-side devices 110. Note that the electric field communication systems 100B and 100C shown in FIGS. 1B and 1C are only examples. The configuration of the electric field communication system is not limited thereto. For example, the electric field communication system 100 may include a component-side device 110 provided with a receiver 220a, and a main-body-side device 120 provided with a transmitter 210b.

<First Embodiment>

FIG. 2 is schematically shows the configuration of the electric field communication system 100C (FIG. 1C) according to the first embodiment. Hereinafter, referring to FIG. 2, a communication principle of the electric field communication system 200 according to the first embodiment is schematically described. The electric field communication system 200 shown in FIG. 2 is a system that performs electric field communication through the communication medium 130, the communication being communication between the transmitter 210a (FIG. 1C) of the component-side device 110 (FIG. 1C) and the receiver 220b of the main-body-side device 120 (FIG. 1C), or communication between the receiver 220a of the component-side device 110 (FIG. 1C) and the transmitter 210b of the main-body-side device 120 (FIG. 1C). Hereinafter, the transmitter 210a of the component-side device and the transmitter 210b of the main-body-side device are simply, collectively called the transmitter 210, and the receiver 220a of the component-side device and the receiver 220b of the main-body-side device are simply, collectively called the receiver 220.

The transmitter 210 mainly includes: a first electrode 212; a second electrode 214 disposed in parallel to the first electrode 212; and a transmitting circuit 216 that is for electric field communication, is connected to the electrodes and is provided between the electrodes. The first electrode 212 is connected to the signal side of the transmitting circuit 216. The second electrode 214 is connected to the ground side of the transmitting circuit 216. In this disclosure, the electrode connected to the signal side of the transmitting circuit 216 is called a signal electrode, and the electrode connected to the ground side of the transmitting circuit 216 is called a ground electrode. The first electrode 212, the second electrode 214 and the transmitting circuit 216 are included in a single housing made of an insulator. The first electrode 212 is disposed on one inner surface of the housing on the communication medium 130 side. The second electrode 214 is disposed on the other inner surface of the housing. The opposite surface of a surface of the second electrode 214 oriented toward the first electrode 212 is oriented toward the space around the transmitter 210. Preferably, the first electrode 212 and the second electrode 214 have a substantially identical size and shape, and each have a shape of a flat body with a sufficient area for electric field communication. The first electrode 212 and the second electrode 214 have, for example, rectangular shapes.

The receiver 220 mainly includes: a third electrode 222; a fourth electrode 224 disposed in parallel to the third electrode 222; and a receiving circuit 226 that is for electric field communication, is connected to the electrodes, and is provided between the electrodes. The third electrode 222 is connected to the signal side of the receiving circuit 226. The fourth electrode 224 is connected to the ground side of the receiving circuit 226. In this disclosure, the electrode connected to the signal side of the receiving circuit 226 is called a signal electrode, and the electrode connected to the ground side of the receiving circuit 226 is called a ground electrode.

The third electrode 222, the fourth electrode 224 and the receiving circuit 226 are included in a single housing made of an insulator. The third electrode 222 is disposed on one inner surface of the housing on the communication medium 130 side. The fourth electrode 224 is disposed on the other inner surface of the housing. The opposite surface of a surface of the fourth electrode 224 oriented toward the third electrode 222 is oriented toward the space around the receiver 220. Preferably, the third electrode 222 and the fourth electrode 224 have a substantially identical size and shape, and each have a shape of a flat body with a sufficient area for electric field communication. The third electrode 222 and the fourth electrode 224 have, for example, rectangular shapes.

The transmitter 210 (transmitting circuit 216) modulates the output signal and the like from the sensor 140 (FIGS. 1A to 1C) into an electric signal intended to be transmitted to the receiver 220 side, and outputs the electric signal as a voltage temporally changing between the first electrode 212 and the second electrode 214. For example, the transmitter 210 applies analog/digital (A/D) conversion to the signal obtained from the sensor 140 (FIG. 1C), and outputs the converted digital signal as a voltage (e.g., an ASK modulation signal) temporally changing between the first electrode 212 and the second electrode 214. A potential difference then occurs between the first electrode 212 and the second electrode 214, causing an electric field. The electric field is transmitted through the communication medium 130 to the receiver 220. The receiver 220 is disposed in the electric field caused by the transmitter 210. When the potential difference is cased between the third electrode 222 and the fourth electrode 224 of the receiver 220 by the caused electric field, the receiving circuit 226 detects and demodulates the potential difference, thereby allowing data transmitted from the transmitter 210 to be obtained.

The transmitter 210 may internally include an internal power source 218 for supplying power for operating the transmitting circuit 216. The internal power source 218 is, for example, a vibration-powered generator that generates power by energy due to vibrations of the component 132, a photovoltaic generator that generates power by sunlight, or a battery. The battery may be, for example, a battery that stores electricity by the electric field transmitted from the main-body-side device 120. The electric field communication system 200 in this disclosure transmits the electric field, which can achieve power transmission and reception, instead of data transmission and reception, without data transmission and reception between the transmitter 210 and the receiver 220. Accordingly, for example, transmission of power from the transmitter 210b of the main-body-side device 120 (FIG. 1C) to the receiver 220a of the component-side devices 110 (FIG. 1C) negates the need of the power source, such as the battery of the component-side devices 110. In a case where the internal power source of the component-side device 110 is a secondary battery or the like, the secondary battery can be charged by transmission of the electric field. Similar to the transmitter 210, the receiver 220 may also include an internal power source 228.

Figure 3:
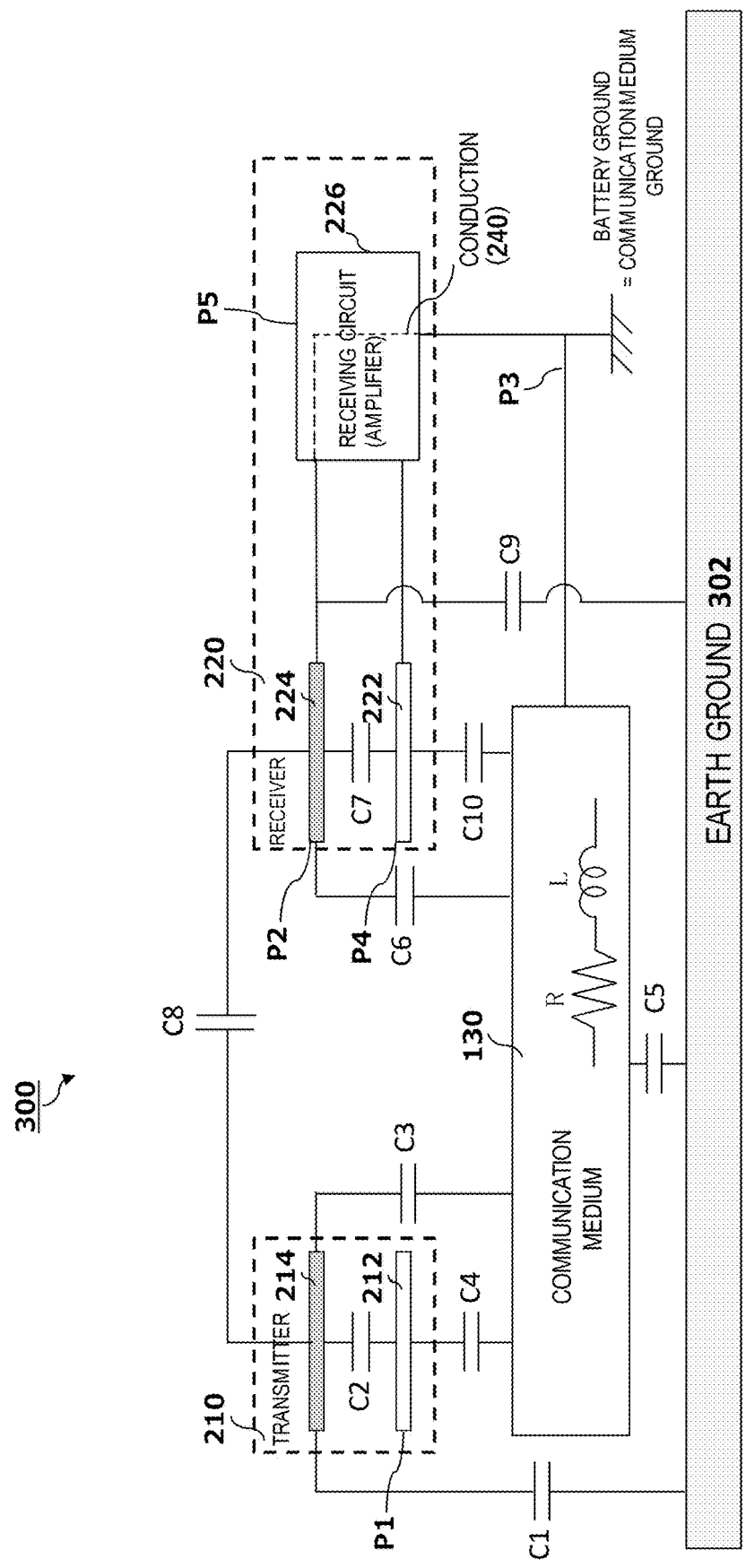
FIG. 3 shows a configuration example of the electric field communication system according to the first embodiment of this disclosure.

FIG. 3 shows a configuration example of the electric field communication system 200 shown in FIG. 2 according to one embodiment of this disclosure. Similar to the electric field communication system 200 shown in FIG. 2, the electric field communication system 300 shown in FIG. 3 includes a transmitter 210, a receiver 220, and a communication medium 130.

The transmitter 210 includes a first electrode 212 and a second electrode 214. The first electrode 212 is connected to the communication medium 130 via a coupling capacitance. The second electrode 214 is connected to the earth ground 302 and the communication medium 130 via a coupling capacitance. Reference sign C1 denotes the capacitance between the second electrode 214 and the earth ground 302. Reference sign C2 denotes the capacitance between the first electrode 212 and the second electrode 214. Reference sign C3 denotes the capacitance between the second electrode 214 and the communication medium 130. Reference sign C4 denotes the capacitance between the first electrode 212 and the communication medium 130. For example, when the component 132 (FIG. 1) included in the communication medium 130 is detached from the connecting section 134 (FIG. 1) included in the communication medium 130, the capacitance C4 decreases, which reduces the electrical coupling between the transmitter 210 and the communication medium 130. Accordingly, the electric field between the transmitter 210 and the receiver 220 becomes less likely to be transmitted, or is incapable of being transmitted.

The receiver 220 includes a third electrode 222, a fourth electrode 224, and a receiving circuit 226. The third electrode 222 is connected to the communication medium 130 in contact with the receiver 220, via a coupling capacitance. The fourth electrode 224 is connected to the earth ground 302 and the communication medium 130 via a coupling capacitance. The fourth electrode 224 is coupled to the battery ground of the receiving circuit 226, and is resultantly conducted with the communication medium 130. Reference numeral C5 denotes the capacitance of the communication medium 130 with respect to the earth ground 302. Reference numeral C6 denotes the capacitance between the fourth electrode 224 and the communication medium 130. Reference numeral C7 denotes the capacitance between the third electrode 222 and the fourth electrode. Reference numeral C8 denotes the capacitance between the second electrode 214 and the fourth electrode 224. Reference numeral C9 denotes the capacitance between the fourth electrode 224 and the earth ground 302. Reference numeral C10 denotes the capacitance between the third electrode 222 and the communication medium 130. The third electrode 222 is connected to the signal side of the receiving circuit 226. The fourth electrode 224 is connected to the ground side of the receiving circuit 226. The fourth electrode 224 of the receiver 220 is capacitively coupled via the earth ground 302, the second electrode 214 of the transmitter 210 is capacitively coupled to the earth ground 302, and the earth ground 302 is used as a feedback transmission path.

The communication medium 130 is connected to the battery ground of the receiving circuit 226, and can be represented as a lumped parameter of the resistance R and the inductance L.

Figure 4A:
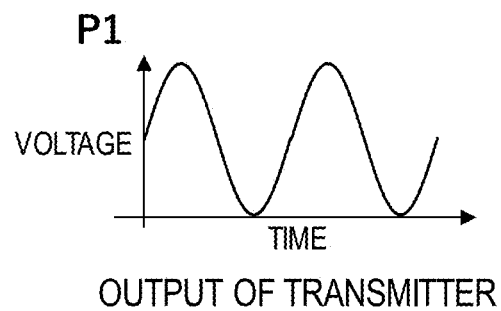
FIG. 4A exemplifies temporal change in voltage of a transmitter signal electrode in the electric field communication system shown in FIG. 3.
Figure 4B:
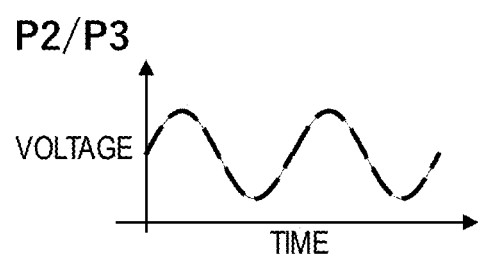
FIG. 4B exemplifies temporal change in voltage of a receiver ground electrode and in voltage of a battery ground relative to the earth ground in the electric field communication system shown in FIG. 3.
Figure 4C:
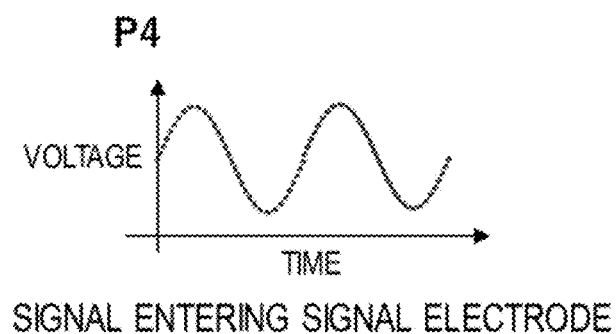
FIG. 4C exemplifies temporal change in voltage of a receiver signal electrode in the electric field communication system shown in FIG. 3.
Figure 4D:
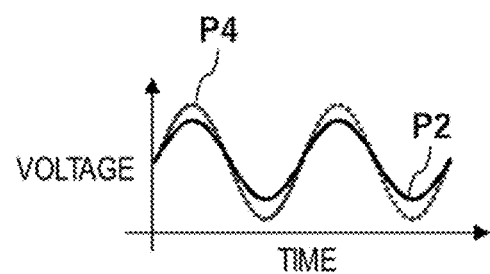
FIG. 4D exemplifies temporal change in voltage of a receiver ground electrode and in voltage of a receiver signal electrode in the electric field communication system shown in FIG. 3.
Figure 4E:
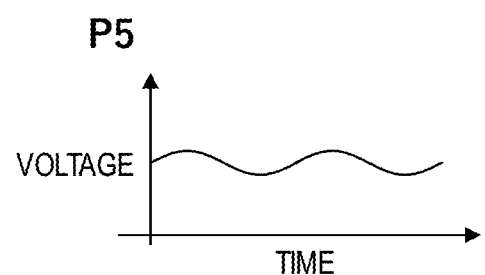
FIG. 4E exemplifies temporal change in voltage of input into a receiving circuit in the electric field communication system shown in FIG. 3.

FIGS. 4A to 4E are graphs exemplifying temporal changes in voltage at points (P1, P2, P3, P4 and P5) indicated in the electric field communication system 300 shown in FIG. 3. FIG. 4A shows the voltage at the first electrode 212 of the transmitter 210 (transmission-side signal electrode; P1). FIG. 4B shows the voltage at the fourth electrode 224 of the receiver 220 (reception-side ground electrode; P2), and the voltage at the battery ground (P3) with respect to the earth ground 302. FIG. 4C shows the voltage at the third electrode 222 of the receiver 220 (reception-side signal electrode; P4). FIG. 4D shows both the voltage at P2, and the voltage at P4. FIG. 4E shows the temporal change in voltage of the received signal at P5, i.e., the receiving circuit 226, and is equivalent to the potential difference between the voltage at P2 and the voltage at P4 shown in FIG. 4D.

As shown in FIG. 3, in the electric field communication system 300, the fourth electrode 224 of the receiving circuit 226 is in conduction (240) with the communication medium 130 via the receiving circuit 226. Accordingly, the potential difference between the third electrode 222 and the fourth electrode decreases. The potential P2 at the ground electrode (fourth electrode 224) of the receiver 220 shown in FIG. 4B, and the potential P4 at the signal electrode (third electrode 222) of the receiver 220 shown in FIG. 4C are in phase and have comparable amplitudes. Consequently, as shown in FIG. 4E, although the potential difference between the potential P4 at the receiver signal electrode (third electrode 222) and the potential P2 at the receiver ground electrode (fourth electrode 224) occurs, the potential difference is not large.

<Second Embodiment>

FIG. 5 schematically shows the configuration according to the second embodiment of this disclosure. An electric field communication system 500 shown in FIG. 5 is the same as the electric field communication system 200 shown in FIG. 2 except in that the configuration of the receiver 220' is different.

The transmitter 210 shown in FIG. 5 is configured similarly to the transmitter 210 described with reference to FIG. 2. Accordingly, the description is omitted here. The receiver 220' shown in FIG. 5 mainly includes: a third electrode 222; a fourth electrode 224 disposed in parallel to the third electrode 222; and a receiving circuit 226 that is for electric field communication, is connected to the electrodes and is provided between the electrodes. The third electrode 222 is connected to the signal side of the receiving circuit 226. The fourth electrode 224 is connected to the ground side of the receiving circuit 226. The third electrode 222, the fourth electrode 224 and the receiving circuit 226 are included in a single housing made of an insulator. The third electrode 222 is disposed on one inner surface of the housing. The opposite surface of a surface of the third electrode 222 oriented toward the fourth electrode is oriented toward the space around the receiver 220'. The fourth electrode 224 is disposed on an inner surface of the housing on the communication medium 130 side. The fourth electrode 224 is coupled to the battery ground of the receiving circuit 226, and is resultantly conducted with the communication medium 130. Alternatively, the fourth electrode 224 may be in direct conduction (240) with the communication medium 130 via a conductor (conductor wire, metal screws, etc.).

Figure 6:
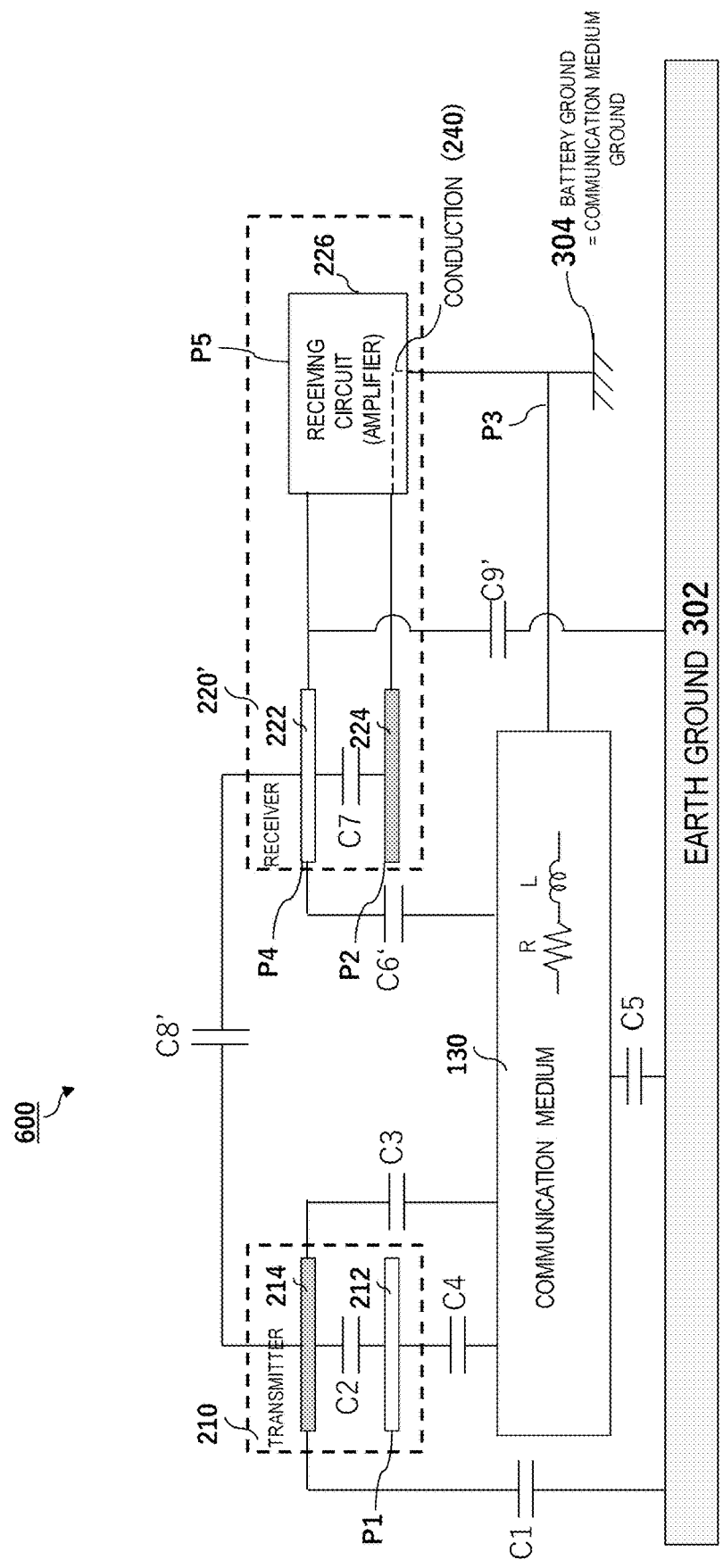
FIG. 6 shows a configuration example of the electric field communication system according to the second embodiment of this disclosure.

FIG. 6 shows a configuration example of the electric field communication system 500 shown in FIG. 5 according to one embodiment of this disclosure. The transmitter 210, the receiver 220' and the communication medium 130 of an electric field communication system 600 shown in FIG. 6 respectively correspond to the transmitter 210, the receiver 220' and the communication medium 130 in the electric field communication system 500 shown in FIG. 5.

The transmitter 210 shown in FIG. 6 is configured similarly to the transmitter 210 having already been described with reference to FIG. 3. Accordingly, the description is omitted. The receiver 220 shown in FIG. 6 includes a third electrode 222, a fourth electrode 224, and a receiving circuit 226. The third electrode 222 is connected to the communication medium 130 in contact with the receiver 220, and to the earth ground 302, via a coupling capacitance. The fourth electrode 224 is conducted with the communication medium 130. Reference sign C6' denotes the capacitance between the third electrode 222 and the communication medium 130. Reference sign C7 denotes the capacitance between the third electrode 222 and the fourth electrode. Reference sign C8' denotes the capacitance between the second electrode 214 and the third electrode 222. Reference sign C9' denotes the capacitance between the third electrode 222 and the earth ground 302. The third electrode 222 of the receiver 220 is capacitively coupled via the earth ground 302, the second electrode 214 of the transmitter 210 is capacitively coupled to the earth ground 302, and the earth ground 302 is used as a feedback transmission path.

One characteristic of the electric field communication system 600 in this embodiment is that the fourth electrode 224 is disposed on the communication medium 130 side. According to the disposition of the fourth electrode 224 on the communication medium 130 side, as described below with reference to FIGS. 7A to 7E, the potential difference between the fourth electrode 224 (ground electrode) and the third electrode 222 (signal electrode) on the receiver 220 side can be increased, which can increase the amplitude of the signal to be input into the receiving circuit 226.

Figure 7A:
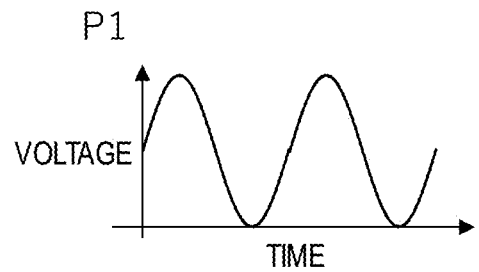
FIG. 7A exemplifies temporal change in voltage of a transmitter signal electrode in the electric field communication system shown in FIG. 6.
Figure 7B:
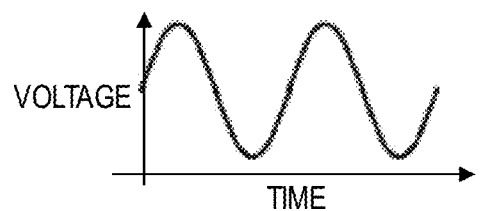
FIG. 7B exemplifies temporal change in voltage of a receiver ground electrode and in voltage of a battery ground relative to the earth ground in the electric field communication system shown in FIG. 6.
Figure 7C:
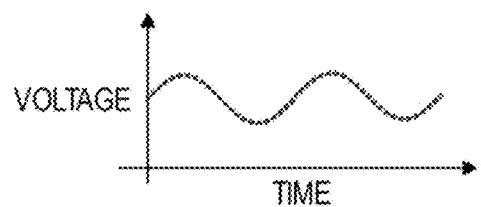
FIG. 7C exemplifies temporal change in voltage of a receiver signal electrode in the electric field communication system shown in FIG. 6.
Figure 7D:
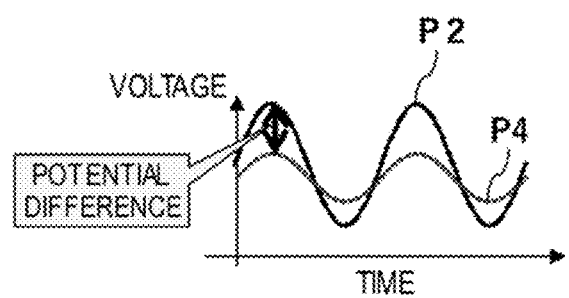
FIG. 7D exemplifies temporal change in voltage of a receiver ground electrode and in voltage of a receiver signal electrode in the electric field communication system shown in FIG. 6.

FIGS. 7A to 7E are graphs exemplifying temporal changes in voltage at points (P1, P2, P3, P4 and P5) indicated in the electric field communication system 600 shown in FIG. 6. FIG. 7A shows the voltage at the first electrode 212 of the transmitter 210 (transmitter signal electrode; P1). FIG. 7B shows the voltage at the fourth electrode 224 of the receiver 220 (reception-side ground electrode; P2), and the voltage at the battery ground (P3) with respect to the earth ground 302. FIG. 7C shows the voltage at the third electrode 222 of the receiver 220 (reception-side signal electrode; P4). FIG. 7D shows both the voltage at P2, and the voltage at P4. FIG. 4E shows the temporal change in voltage of the received signal at the receiving circuit 226 (P5), and is equivalent to the potential difference between the voltage at P2 and the voltage at P4 shown in FIG. 7D.

Figure 7E:
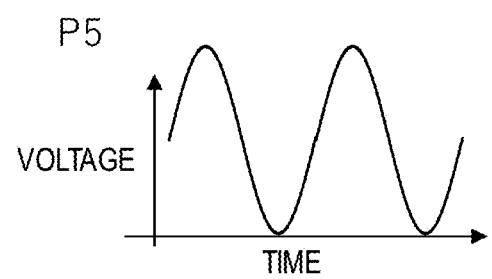
FIG. 7E exemplifies temporal change in voltage of input into a receiving circuit in the electric field communication system shown in FIG. 6.

The voltage at the third electrode 222 (receiver signal electrode; P4) shown in FIG. 7C has a smaller amplitude than the voltage at the third electrode 222 (receiver signal electrode; P4) shown in FIG. 4C. This is because the third electrode 222 in the configuration in FIG. 6 is more remote from the communication medium 130 than that in the configuration in FIG. 3, and accordingly the capacitance coupling between the communication medium 130 and the third electrode 222 is small, which reduces the amplitude of the signal to be input into the third electrode 222 (receiver signal electrode). Consequently, as shown in FIG. 7E, the potential difference between the voltage at the receiver ground electrode and the voltage at the receiver signal electrode when the fourth electrode 224 (receiver ground electrode) is conducted with the communication medium 130 becomes larger than the potential difference shown in FIG. 4E. As a result, the signal to be input into the receiving circuit 226 can be increased.

Figure 8:
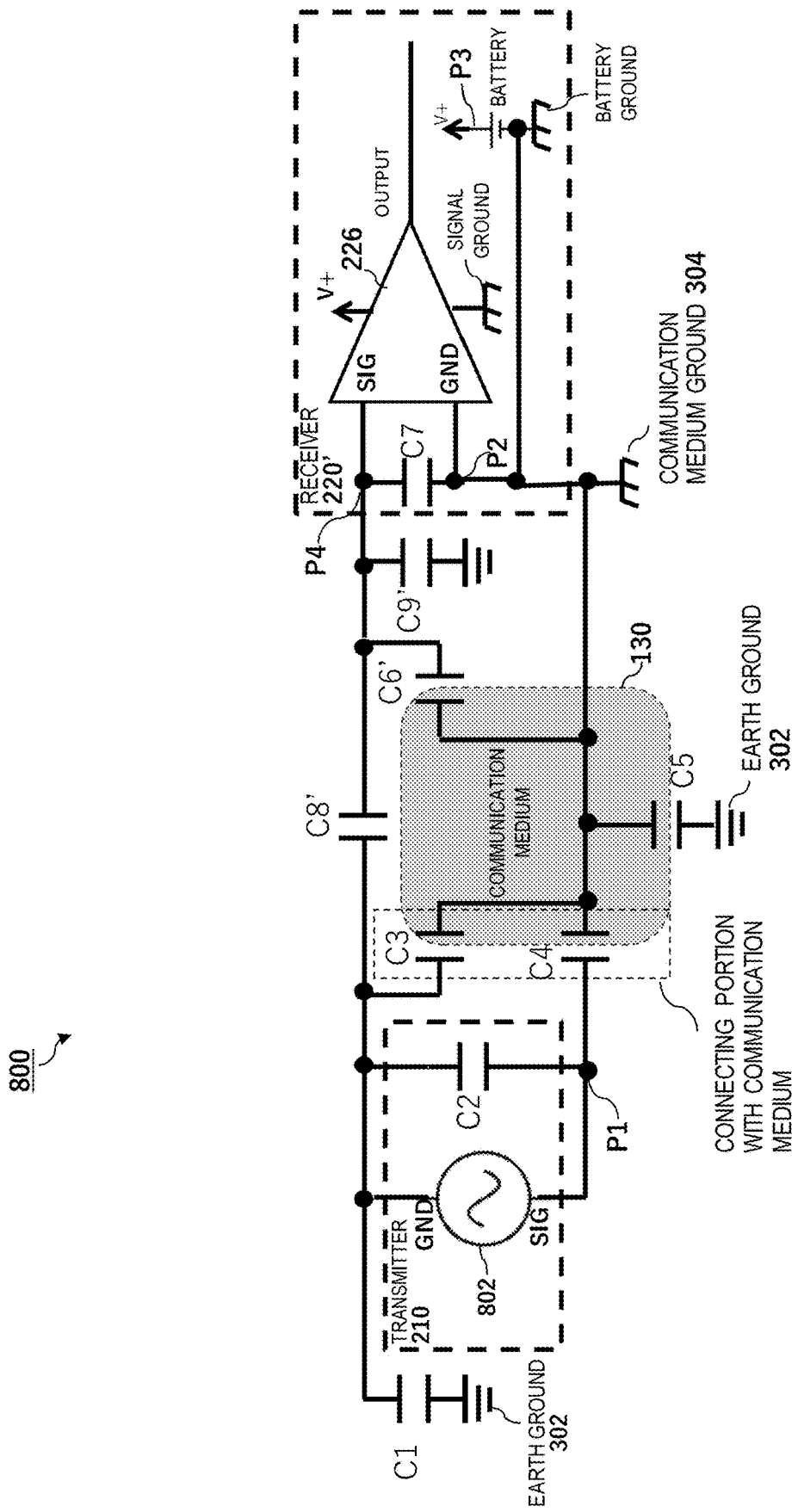
FIG. 8 shows an example of an equivalent circuit of the electric field communication system shown in FIG. 6.

FIG. 8 shows an example of an equivalent circuit of the electric field communication system 600 shown in FIG. 6. A signal source 802 and the capacitance C2 in FIG. 8 correspond to those of the transmitter 210 in FIG. 6. The receiving circuit 226 exemplified in FIG. 8 is a single-ended output amplifier. The fourth electrode 224 is connected to the ground side of the receiving circuit 226. Note that the receiving circuit 226 may be a difference amplifier.

One characteristic of the electric field communication system 800 in this disclosure is that the fourth electrode 224 is disposed on the communication medium 130 side as described with reference to FIG. 6. Such a configuration can increase the potential difference between the fourth electrode 224 and the third electrode 222, and increase the signal to be input into the receiving circuit 226 accordingly. The configuration according to the first embodiment, and the configuration corresponding to the second embodiment are actually constructed. The intensities of signals output from the receivers 220 in the both configurations are compared by an experiment. Hereinafter, referring to FIGS. 9 and 10, the configuration of the experiment is described about an experiment result with reference to FIG. 11.

Figure 9:
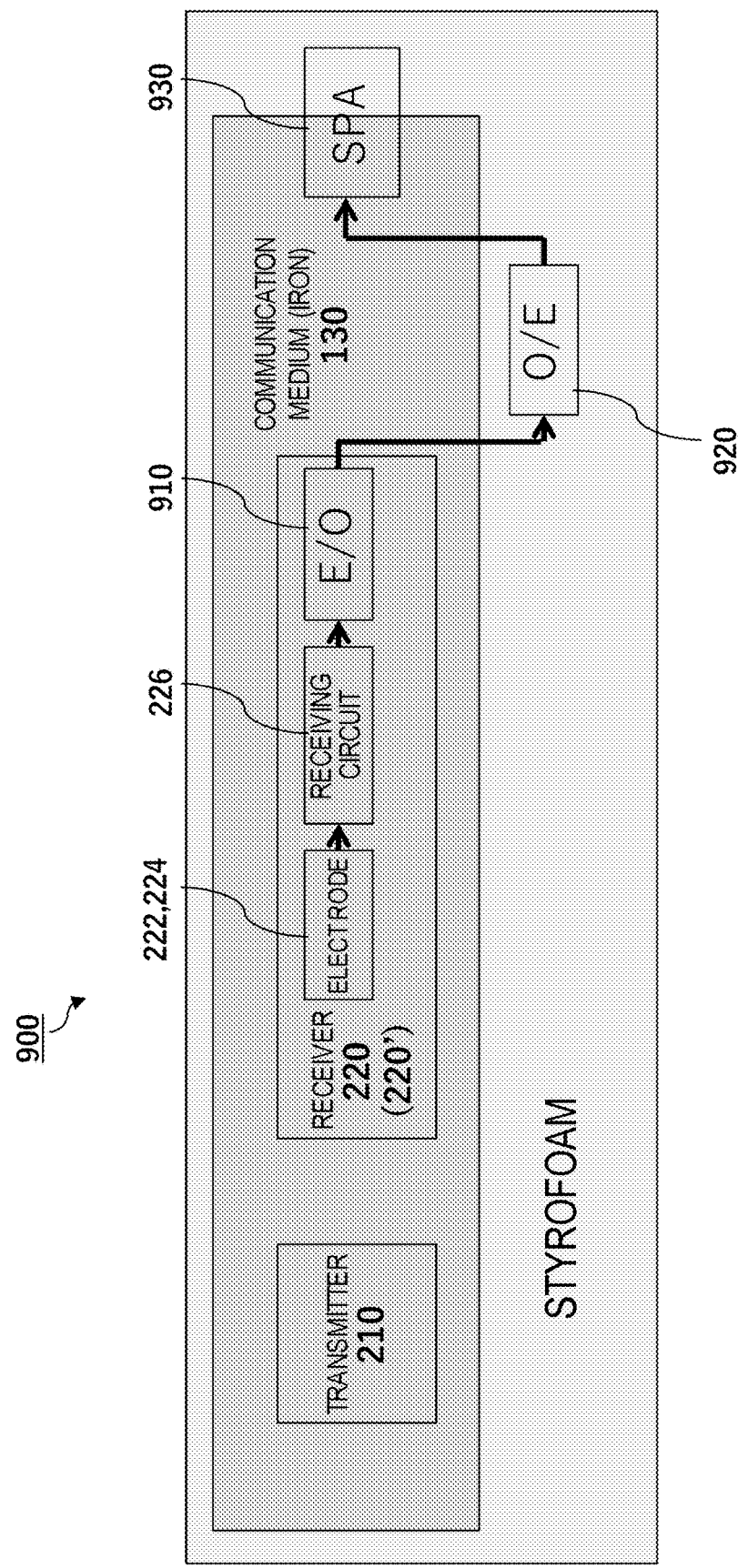
FIG. 9 schematically shows an experiment configuration according to one embodiment of this disclosure.

FIG. 9 schematically shows an experiment configuration 900 according to one embodiment of this disclosure. The receiver 220 of the experiment configuration 900 includes a third electrode 222, a fourth electrode 224, a receiving circuit 226, and an electrical-optical converter 910. In this experiment, a spectrum analyzer (SPA) 930 is used, and a signal having been transmitted from the transmitter 210 to the receivers 220 and 220' (hereinafter the receivers 220 and 220' are sometimes collectively called the receiver 220) and having been output from the receiver 220 is measured. The electrical-optical converter (E/O) 910, and an optical-electrical converter (O/E) 920 are disposed in the housing, that is an insulator, for preventing high-frequency interference between the receiving circuit 226 and the SPA 930.

Figure 10A:
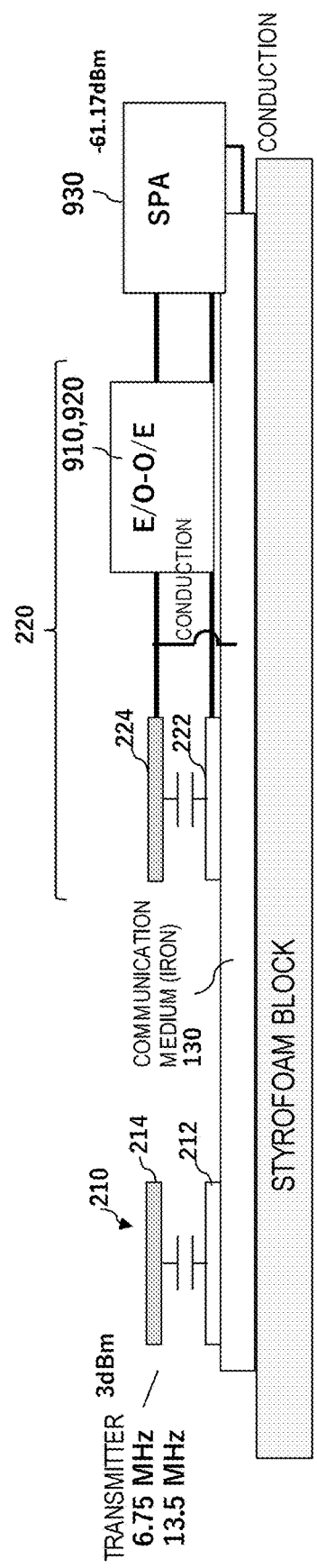
FIG. 10A schematically shows an experiment configuration according to one embodiment of this disclosure (the receiver signal electrode is disposed on a communication medium side).
Figure 10B:
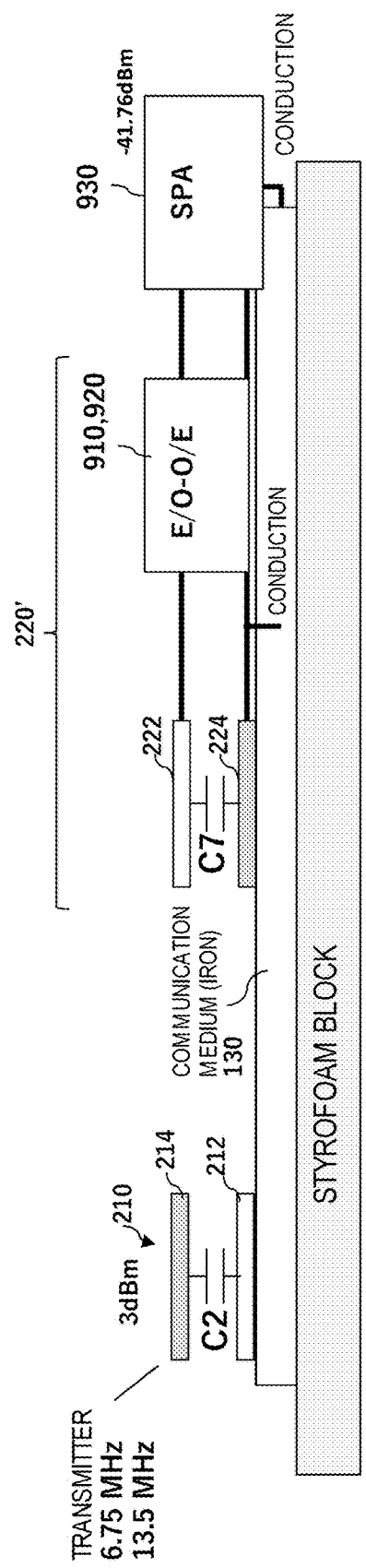
FIG. 10B schematically shows an experiment configuration according to one embodiment of this disclosure (the receiver ground electrode is disposed on a communication medium side).

FIGS. 10A and 10B are sectional views of the experiment configuration shown in FIG. 9. FIG. 10A shows a state where the third electrode 222 (receiver signal electrode) is disposed on the communication medium 130 side, and corresponds to the system 300 according to the first embodiment shown in FIG. 3. FIG. 10B shows a state where the fourth electrode 224 (receiver ground electrode) is conducted with the communication medium 130 and is disposed on the communication medium 130 side, and corresponds to the system 600 according to the second embodiment shown in FIG. 6. According to the experiment, for each of the configuration in FIG. 10A and the configuration in FIG. 10B, graphs of output signals at the receivers 220 and 220' sides using a spectrum analyzer 930 are obtained. As a result of analysis of output signal intensities from the obtained graphs of the output signals, the output signal intensity on the receiver 220 side is −61.17 dBm with the configuration in FIG. 10A, and −41.76 dBm with the configuration in FIG. 10B. The configuration in FIG. 10B has a higher signal level obtained on the receiver side.

Figure 11:
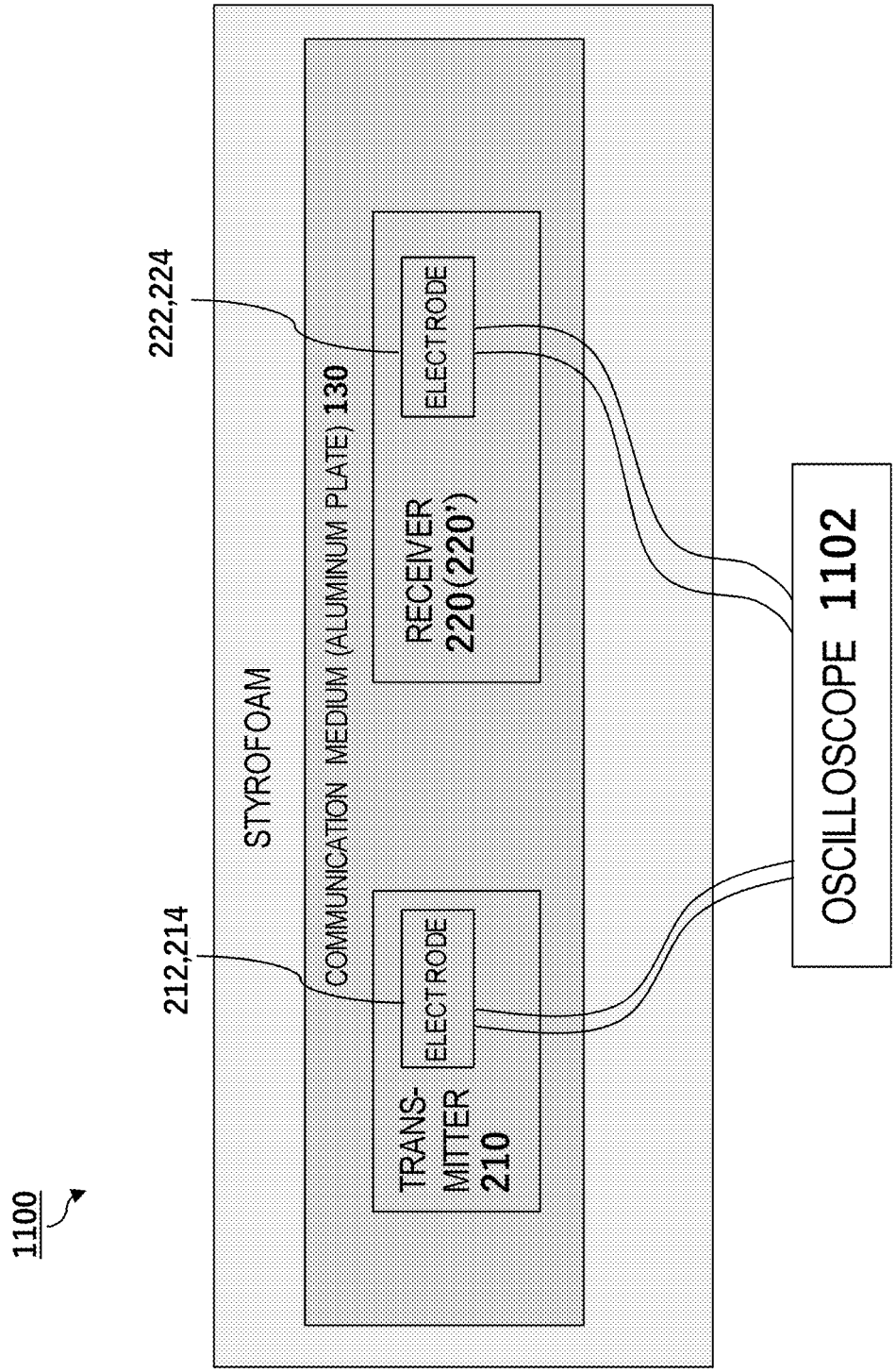
FIG. 11 schematically shows an experiment configuration according to one embodiment of this disclosure.

FIG. 11 schematically shows an experiment configuration 1100 according to one embodiment of this disclosure. A transmitter 210 of the experiment configuration 1100 includes a first electrode 212, and a second electrode 214. A receiver 220 (220') includes a third electrode 222, and a fourth electrode 224. In this experiment, signal lines of an oscilloscope 1102 are connected to the electrodes (the first electrode 212, second electrode 214, third electrode 222 and fourth electrode 224), and temporal change in output voltage waveform received by each of the third electrode 222, and the fourth electrode 224 of the receiver 220 is observed.

Figure 12A:
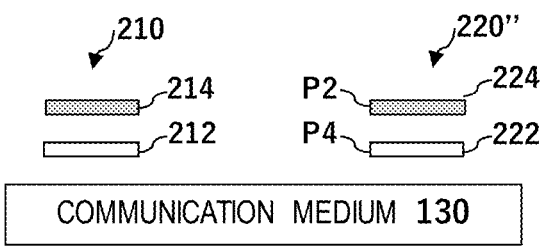
FIG. 12A schematically shows an experiment configuration according to one embodiment of this disclosure (a receiver signal electrode is disposed on a communication medium side).
Figure 12B:
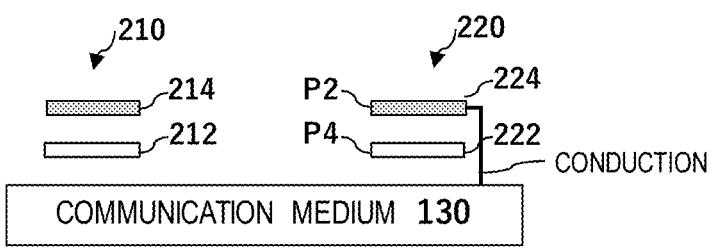
FIG. 12B schematically shows an experiment configuration according to one embodiment of this disclosure (the receiver signal electrode is disposed on the communication medium side, and the receiver ground electrode is conducted with the communication medium).
Figure 12C:
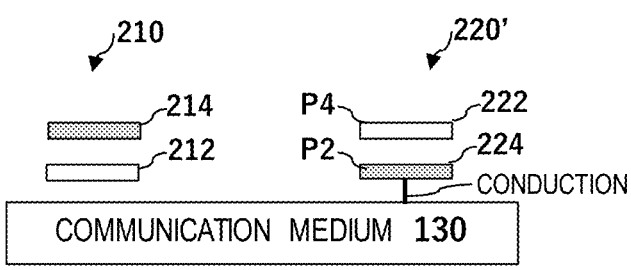
FIG. 12C schematically shows an experiment configuration according to one embodiment of this disclosure (the receiver ground electrode is disposed on the communication medium side, and is conducted with the communication medium).

FIGS. 12A, 12B and 12C are simplified diagrams of configurations corresponding to the experiment configuration 1100 shown in FIG. 11. FIGS. 12A and 12B show a state where the third electrode 222 (receiver signal electrode) is disposed on the communication medium 130 side, and corresponds to the system 300 according to the first embodiment shown in FIG. 3. Note that the receiver 220 in FIG. 12B is different from the receiver 220 shown in FIG. 12A in that the fourth electrode 224 (receiver ground electrode) is conducted with the communication medium 130. The configuration of the receiver 220 in FIG. 12B is more similar to a configuration in an actual operation than the configuration of the receiver 220" in FIG. 12A. That is, in a case where the configuration in this disclosure is applied to a power shovel, the battery ground of the receiving circuit 226, and the frame portion of the power shovel, which is the communication medium 130, are conducted with each other via the receiving circuit 226. As a result, the fourth electrode 224 is conducted with the communication medium 130. FIG. 12C shows a state where the fourth electrode 224 (receiver ground electrode) is disposed on the communication medium 130 side, and is conducted with the communication medium 130, and corresponds to the system 600 according to the second embodiment shown in FIG. 6.

Figure 13A:
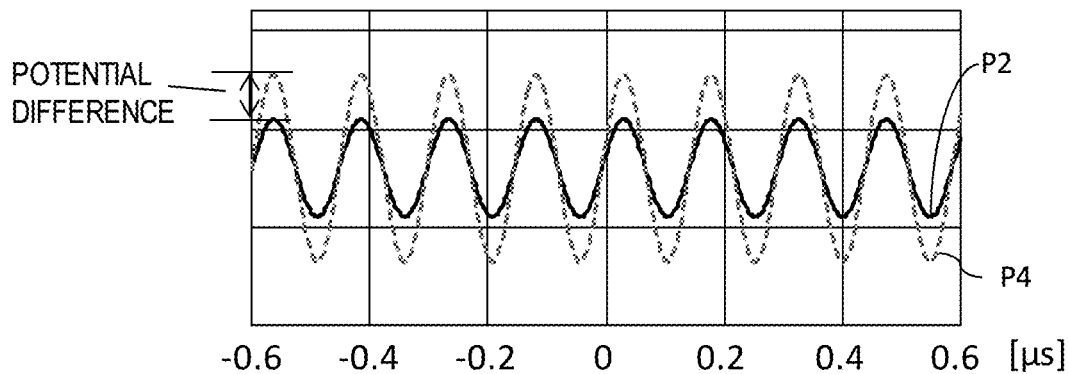
FIG. 13A exemplifies the waveform of a signal obtained as a result of a simulation in the configuration in FIG. 12A.
Figure 13B:
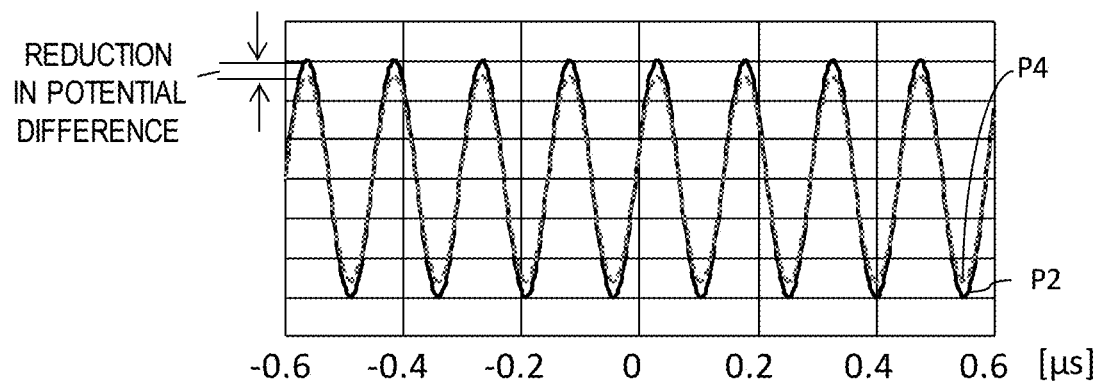
FIG. 13B exemplifies the waveform of a signal obtained as a result of a simulation in the configuration in FIG. 12B.
Figure 13C:
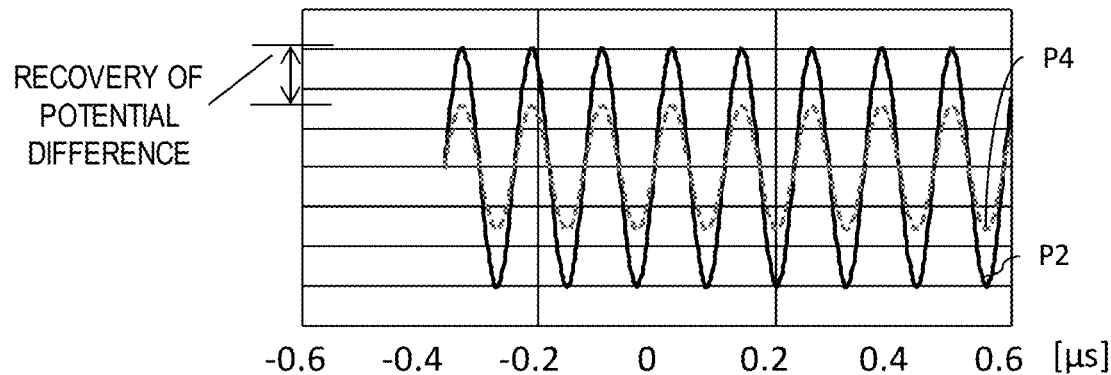
FIG. 13C exemplifies the waveform of a signal obtained as a result of a simulation in the configuration in FIG. 12C.

FIGS. 13A, 13B and 13C respectively show parts of waveforms of output signals obtained as a result of simulation of the configuration in FIG. 12A, that of the configuration in FIG. 12B, and that of the configuration in FIG. 12C. In the graphs shown in FIGS. 13A, 13B and 13C, a dark color indicates the temporal change in potential at the fourth electrode 224 (receiver ground electrode; P2), and a light color indicates the temporal change in potential at the third electrode 222 (receiver signal electrode; P4).

As a result of the simulation, the difference between the potentials at the third electrode 222 and the fourth electrode 224 shown in FIG. 13B is smaller than the difference between the potentials at the third electrode 222 and the fourth electrode 224 shown in FIG. 13A. This is because in the configuration in FIG. 12B, the fourth electrode 224 is conducted with the communication medium 130, which increases the voltage at the fourth electrode 224 (ground electrode), and reduces the potential difference between the third electrode 222 and the fourth electrode 224.

As a result of the simulation, the potential difference between the voltage at the third electrode 222 and the voltage at the fourth electrode 224 shown in FIG. 13C is larger than the potential difference between the voltage at the third electrode 222 and the voltage at the fourth electrode 224 shown in FIG. 13B. This is because as shown in FIG. 12C, the fourth electrode 224 is disposed on the communication medium side, and the third electrode 222 is disposed apart from the communication medium 130 side, which reduces the capacitance coupling between the communication medium 130 and the third electrode 222, and reduces the amplitude of the voltage at the third electrode 222, and resultantly increases the potential difference from the fourth electrode 224.

According to this disclosure, as shown in FIG. 12C, the fourth electrode 224 is disposed on the communication medium 130 side, which can increase the potential difference between the potential P2 at the fourth electrode 224 and the potential P4 at the third electrode 222, and improve the communication efficiency between the transmitter 210 and the receiver 220 in comparison with the configuration where the third electrode 222 is disposed on the communication medium 130 side as shown in FIGS. 12A and 12B.

<Third Embodiment>

Figure 14:
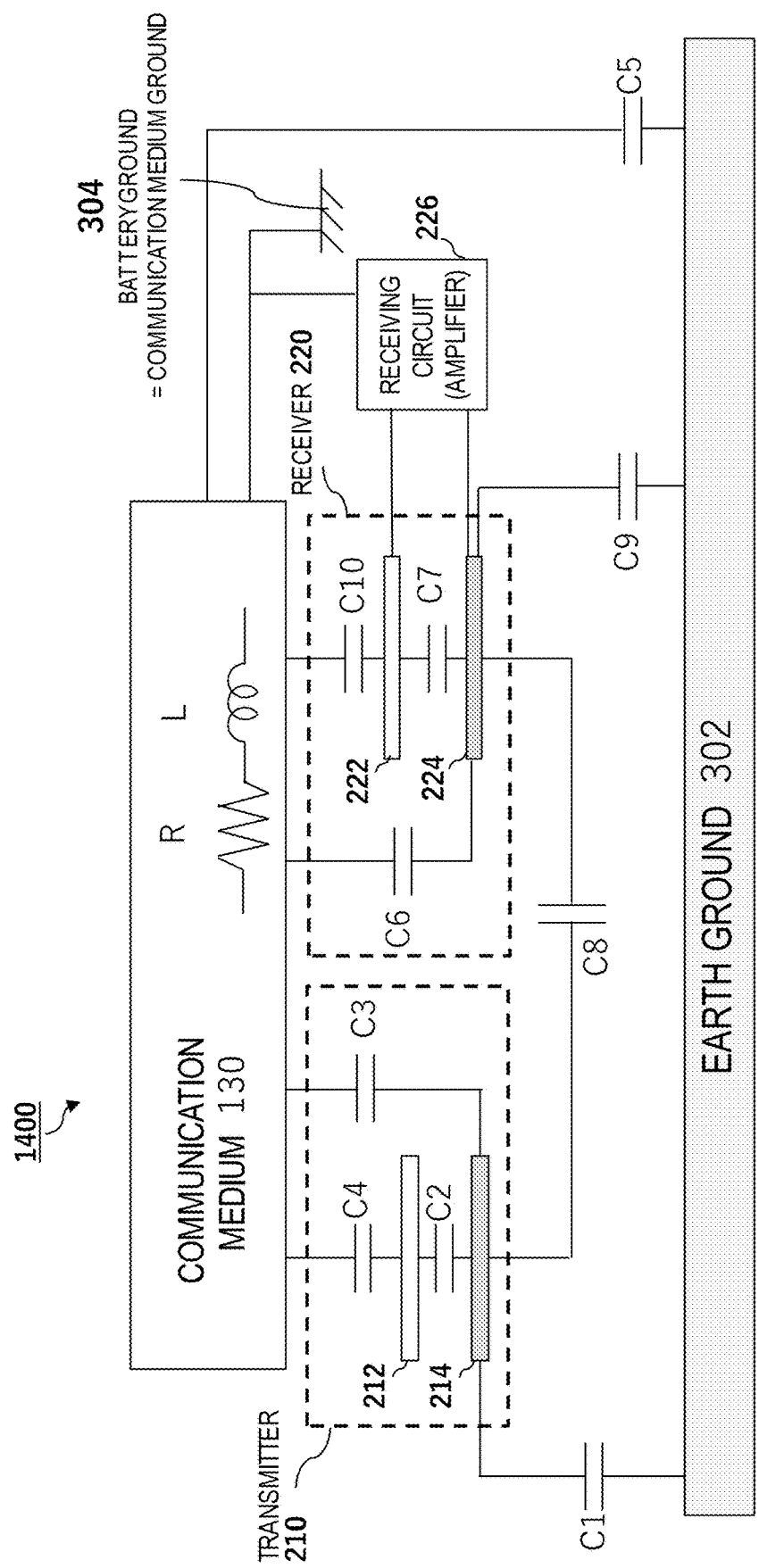
FIG. 14 schematically shows an electric field communication system according to a third embodiment of this disclosure.

FIG. 14 shows a configuration example of an electric field communication system 1400 according to one embodiment of this disclosure. Similar to the electric field communication system 300 shown in FIG. 3, the electric field communication system 1400 includes a transmitter 210, a receiver 220, and a communication medium 130, but is different in positions at which the transmitter 210 and the receiver 220 are disposed. That is, in FIG. 14, the transmitter 210 and the receiver 220 are disposed between the communication medium 130 and the earth ground 302. The electric field communication system 1400 shown in FIG. 14 has an equivalent circuit that is not different from that of the electric field communication system 300 described with reference to FIG. 3. Accordingly, the description of configuration elements equivalent to those having already been described with reference to FIG. 3 is omitted.

As described above, the transmitter 210 and the receiver 220 are disposed between and in physical contact with the communication medium 130 and the earth ground 302. Accordingly, the distance between the second electrode 214 (transmitter ground electrode) and the earth ground 302 is reduced, and the capacitance C1 between the second electrode 214 and the earth ground 302 is increased. The distance between the fourth electrode 224 (receiver ground electrode) and the earth ground 302 is reduced, and the capacitance C9 between the fourth electrode 224 and the earth ground 302 is increased. Increase in the capacitances C1 and C9 reduces impedances X1 and X9 (not shown), which in turn reduces the voltages applied to these impedances. According to the voltage-dividing law, for example, the voltage applied to the capacitance C7 between the third electrode 222 and the fourth electrode is relatively increased. Accordingly, the signal intensity obtained on the receiver 220 side becomes high, which improves the voltage gain. Hereinafter, as shown in FIGS. 15A to 15D, the arrangement positions between the transmitter 210 and the receiver 220 are variously changed, and the way of change in signal intensity obtained by the receiver 220 is measured.

FIGS. 15A to 15D are simplified diagrams corresponding to the experiment configuration shown in FIG. 9. In FIGS. 15A to 15D, the transmitter 210 and the receiver 220 are disposed on the communication medium, or between and in physical contact with the communication medium 130 and the earth ground 302. The configuration shown in FIG. 15A corresponds to the electric field communication system 300 shown in FIG. 3. The configuration shown in FIG. 15D corresponds to the electric field communication system 1400 shown in FIG. 14.

Figure 15A:
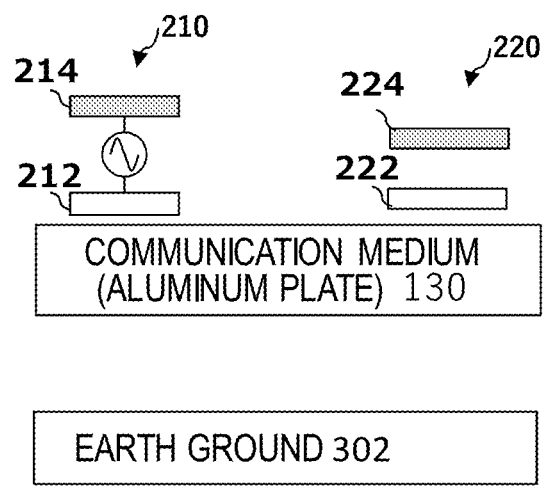
FIG. 15A schematically shows an experiment configuration according to one embodiment of this disclosure (both the receiver and the transmitter are disposed on the communication medium).

In FIG. 15A, both the transmitter 210 and the receiver 220 are disposed on the communication medium 130 in physical contact with the communication medium 130. In more detail, the first electrode 212 of the transmitter 210, and the third electrode 222 of the receiver 220 are disposed on the communication medium 130 side. In the configuration shown in FIG. 15A, the gain of the signal obtained by the receiver 220 is −106.635 dB.

Figure 15B:
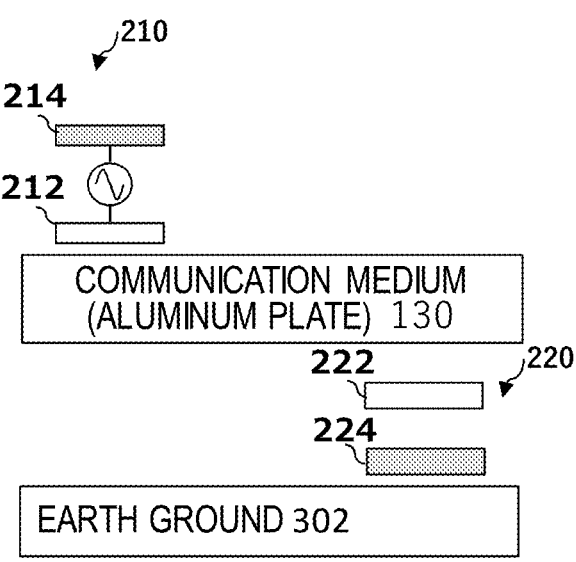
FIG. 15B schematically shows an experiment configuration according to one embodiment of this disclosure (the transmitter is arranged on the communication medium, and the receiver is disposed between the communication medium and the earth ground).

In FIG. 15B, the transmitter 210 is disposed on the communication medium 130 and in physical contact with the communication medium 130, and the receiver 220 is disposed between the communication medium 130 and the earth ground 302. One side of the receiver 220 is disposed in physical contact with the communication medium 130. In more detail, the first electrode 212 of the transmitter 210 and the third electrode 222 of the receiver 220 are disposed on the communication medium 130 side, and are connected to the communication medium 130 via capacitance coupling. The fourth electrode 224 of the receiver 220 is disposed on the earth ground 302 side, and is connected to the earth ground 302 via capacitance coupling. According to this configuration, the capacitance C9 (FIG. 14) between the fourth electrode 224 and the earth ground 302 is increased. Increase in the capacitance C9 reduces impedance X9 (not shown), which in turn reduces the voltage applied to the impedance. According to the voltage-dividing law, the voltage applied to the capacitance between the third electrode 222 and the fourth electrode is relatively higher than the voltage applied to the capacitance C7 between the third electrode 222 and the fourth electrode measured in the configuration in FIG. 15A. Consequently, in the configuration shown in FIG. 15B, the gain of the signal output from the receiver 220 is −98.3545 dB, which is higher than the gain of the signal obtained in the configuration in FIG. 15A.

Figure 15C:
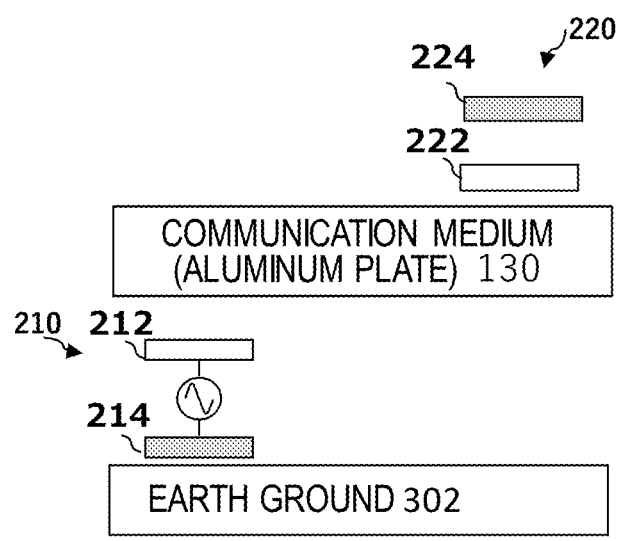
FIG. 15C schematically shows an experiment configuration according to one embodiment of this disclosure (the transmitter is disposed between the communication medium and the earth ground, and the receiver is arranged on the communication medium).

In FIG. 15C, the transmitter 210 is disposed between and in physical contact with the communication medium 130 and the earth ground 302, and the receiver 220 is disposed on the communication medium 130 in physical contact with the communication medium 130. One side of the transmitter 210 is disposed in physical contact with the communication medium 130. In more detail, the first electrode 212 of the transmitter 210 is disposed on the communication medium 130 side, and is connected to the communication medium 130 via capacitance coupling. The second electrode 214 of the transmitter 210 is disposed on the earth ground 302 side, and is connected to the earth ground 302 via capacitance coupling. According to this configuration, the voltage applied to the capacitance C7 between the third electrode 222 and the fourth electrode is higher than the voltage applied on the capacitance C7 between the third electrode 222 and the fourth electrode measured in the configuration in FIG. 15A. Consequently, in the configuration shown in FIG. 15C, the gain of the signal output from the receiver 220 is −99.1745 dB, which is higher than the gain of the signal obtained in the configuration in FIG. 15A.

Figure 15D:
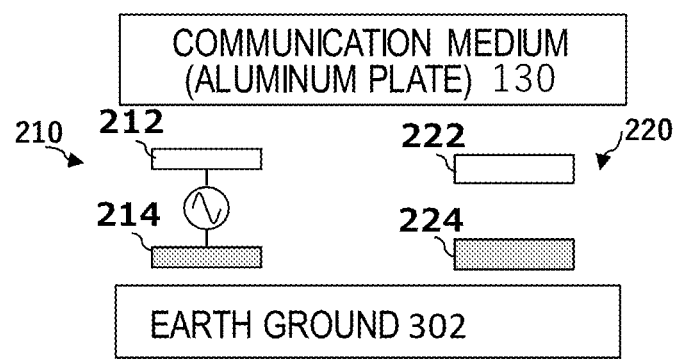
FIG. 15D schematically shows an experiment configuration according to one embodiment of this disclosure (both the transmitter and the receiver are arranged between the communication medium and the earth ground).

FIG. 15D shows that both the transmitter 210 and the receiver 220 are disposed between and in contact with the communication medium 130 and the earth ground 302. That is, the first electrode 212 of the transmitter 210, and the third electrode 222 of the receiver 220 are disposed on the communication medium 130 side. The second electrode 214 of the transmitter 210, and the fourth electrode 224 of the receiver 220 are disposed on the earth ground 302 side. According to this configuration, the voltage applied to the capacitance C7 between the third electrode 222 and the fourth electrode is higher than the voltage applied on the capacitance C7 between the third electrode 222 and the fourth electrode measured in the configurations in FIGS. 15B and 15C. Consequently, in the configuration shown in FIG. 15D, the gain of the signal output from the receiver 220 is −89.1645 dB, which is higher than the gain of the signal obtained in the configurations in FIGS. 15B and 15C.

According to this disclosure, as shown in FIGS. 15B and 15C, any of the transmitter 210 and the receiver 220 is thus disposed between the communication medium 130 and the earth ground 302, which can obtain a higher gain at the receiver 220 than the configuration shown in FIG. 15A. Furthermore, as shown in FIG. 15D, both the transmitter 210 and the receiver 220 are thus disposed between the communication medium 130 and the earth ground 302, which can obtain a much higher gain at the receiver 220 than the configurations shown in FIGS. 15B and 15C. For example, the gain measured with the configuration shown in FIG. 15A is −106.635 dB, while the gain measured with the configuration shown in FIG. 15D is −89.1645 dB; the difference therebetween is about 17.5 dB.

The embodiments of the present invention have thus been described. The aforementioned embodiments are for facilitating understanding of the present invention, but do not limit the present invention. The present invention can be modified and improved without departing from the spirit, and it is a matter of course that the present invention encompasses its equivalents. In a range capable of solving at least part of the problems described above, or a range where part of advantageous effects is exerted, any combination of the embodiments and modifications can be implemented. Any combination and omission of components described in Claims and Description are allowed.

Figure 16:
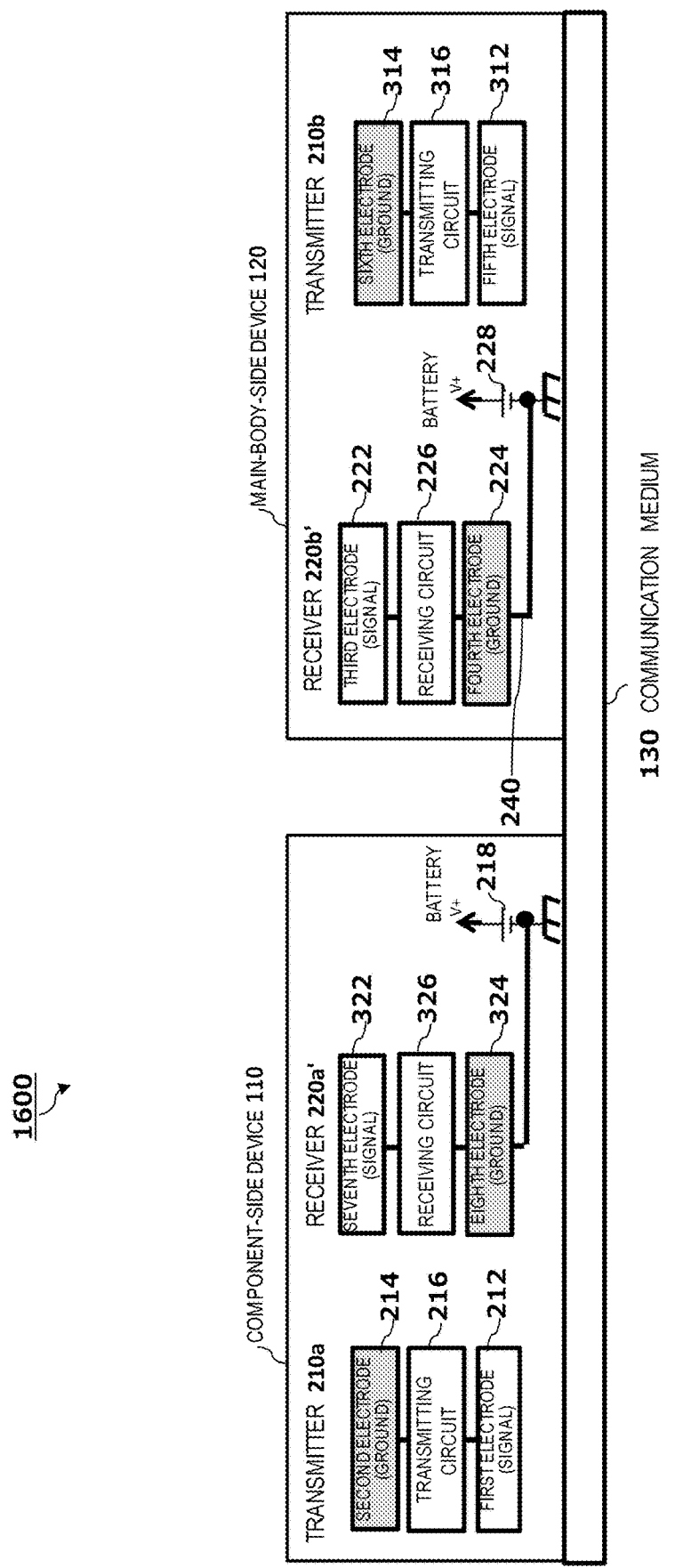
FIG. 16 schematically shows an electric field communication system according to one embodiment of this disclosure.

FIG. 16 schematically shows an electric field communication system 1600 according to one embodiment of this disclosure. The component-side devices 110 includes a receiver 220a' in addition to the transmitter 210a. The main-body-side device 120 includes a transmitter 210b in addition to the receiver 220b'. The transmitter 210a and the receiver 220b' of the electric field communication system 1200 respectively correspond to the transmitter 210 and the receiver 220' having described with reference to FIG. 5. Accordingly, the description is omitted here.

The main-body-side device 120 is in physical contact with the communication medium 130. The transmitter 210b of the main-body-side device 120 includes a fifth electrode 312, the sixth electrode 314, and a transmitting circuit 316. The fifth electrode 312 (signal electrode) is connected to the signal side of the transmitting circuit 316, and the sixth electrode 314 (ground electrode) is connected to the ground side. The transmitting circuit 316 causes an electric field dependent on the potential difference between the fifth electrode 312 (signal electrode) connected to the communication medium via a coupling capacitance, and the sixth electrode 314 (ground electrode) connected to the earth ground 302 and the communication medium 130 via a coupling capacitance.

The component-side devices 110 is in physical contact with the communication medium 130. The receiver 220a' of the component-side devices 110 includes a seventh electrode 322, an eighth electrode 324, and a receiving circuit 326. The seventh electrode 322 (signal electrode) is connected to the signal side of the receiving circuit 326, and the eighth electrode 324 (ground electrode) is connected to the ground side. The receiving circuit 326 detects the potential difference caused between the seventh electrode connected to the communication medium 130 and the earth ground 302 via a coupling capacitance, and the eighth electrode conducted with the communication medium 130, and obtains data transmitted from the transmitter. The transmitter 210b of the main-body-side device 120, and the receiver 220a' of the component-side device 110 communicate through the electric field via the communication medium 130.

REFERENCE SIGNS LIST ef . . . Electric field
100A, 100B, 100C, 200, 300, 500, 600, 1200 . . . Electric field communication system
110 . . . Component-side device
120 . . . Main-body-side device
130 . . . Communication medium
132 . . . Component
134 . . . Connecting section
136 . . . Main body
140 . . . Sensor
150 . . . Processing unit
160 . . . External communication device
210 . . . Transmitter
212 . . . First electrode (transmitter signal electrode)
214 . . . Second electrode (transmitter ground electrode)
216 . . . Transmitting circuit
220, 220', 220" . . . Receiver
222 . . . Third electrode (receiver signal electrode)
224 . . . Fourth electrode (receiver ground electrode)
226 . . . Receiving circuit
240 . . . Conduction

The invention claimed is:

1. An electric field communication system communicating through an electric field, comprising:

a communication medium made of a material capable of transmitting the electric field, the communication medium comprising a component and a main body;

a first transmitter that generates an electric field dependent on a potential difference between a first electrode, which is disposed on a side of the communication medium and is connected to the communication medium via a coupling capacitance, and a second electrode connected to an earth ground via a coupling capacitance, with the first electrode being connected on a signal side of the first transmitter, and the second electrode being connected on a ground side of the first transmitter, the first transmitter in contact with the component;

a first receiver disposed in contact with the main body; and a processing unit that detects that the component is detached from the main body when an intensity of a signal generated based on the electric field transmitted from the first transmitter is less than a threshold, wherein the first transmitter and the first receiver communicate with each other through the electric field via the communication medium.

2. The electric field communication system according to claim 1, wherein the first receiver comprises:
  a third electrode connected to the earth ground via a coupling capacitance;
  a fourth electrode disposed on a side of the communication medium; and
  a receiving circuit, the third electrode being connected on a signal side of the receiving circuit, the fourth electrode being connected on a ground side of the receiving circuit, and the receiving circuit outputs a signal dependent on a potential difference between the third electrode and the fourth electrode generated by the electric field transmitted from the transmitter.

3. The electric field communication system according to claim 2, further comprising a sensor that detects a state of the component of the communication medium with which the first transmitter is in contact, or a surrounding environment of the component, and the first transmitter outputs a signal dependent on an output signal from the sensor, as a voltage temporally changing between the first electrode and the second electrode.

4. The electric field communication system according to claim 3, wherein the sensor is a sensor that detects movement of the component, and the processing unit calculates an operating time period of the component, based on the movement of the component detected by the sensor.

5. The electric field communication system according to claim 3, wherein the sensor is a sensor that detects a surrounding environment of the component, and the processing unit detects whether the component is in an appropriate operating environment, based on the surrounding environment of the component detected by the sensor.

6. The electric field communication system according to claim 2, further comprising a sensor that detects a state of the component of the communication medium with which the first transmitter is in contact, or a surrounding environment of the component, and the first transmitter outputs a signal dependent on an output signal from the sensor, as a voltage temporally changing between the first electrode and the second electrode.

7. The electric field communication system according to claim 6, wherein the sensor is a sensor that detects movement of the component, and the processing unit calculates an operating time period of the component, based on the movement of the component detected by the sensor.

8. The electric field communication system according to claim 6, wherein the sensor is a sensor that detects a surrounding environment of the component, and the processing unit detects whether the component is in an appropriate operating environment, based on the surrounding environment of the component detected by the sensor.

9. The electric field communication system according to claim 1, wherein the first receiver is disposed between and in contact with the earth ground and the communication medium, and the first receiver comprises:
  a third electrode that is disposed on a side of the communication medium, and is connected to the communication medium via capacitance coupling; and
  a fourth electrode that is disposed on a side of the earth ground, and is connected to the earth ground via capacitance coupling.

10. The electric field communication system according to claim 9, wherein the first transmitter is disposed between and in contact with the earth ground and the communication medium, and the second electrode of the first transmitter is disposed on a side of the earth ground.

11. The electric field communication system according to claim 10, further comprising a sensor that detects a state of the component of the communication medium with which the first transmitter is in contact, or a surrounding environment of the component, and the first transmitter outputs a signal dependent on an output signal from the sensor, as a voltage temporally changing between the first electrode and the second electrode.

12. The electric field communication system according to claim 11, wherein the sensor is a sensor that detects movement of the component, and the processing unit calculates an operating time period of the component, based on the movement of the component detected by the sensor.

13. The electric field communication system according to claim 11, wherein the sensor is a sensor that detects a surrounding environment of the component, and the processing unit detects whether the component is in an appropriate operating environment, based on the surrounding environment of the component detected by the sensor.

14. The electric field communication system according to claim 9, further comprising a sensor that detects a state of the component of the communication medium with which the first transmitter is in contact, or a surrounding environment of the component, and the first transmitter outputs a signal dependent on an output signal from the sensor, as a voltage temporally changing between the first electrode and the second electrode.

15. The electric field communication system according to claim 14, wherein the sensor is a sensor that detects movement of the component, and the processing unit calculates an operating time period of the component, based on the movement of the component detected by the sensor.

16. The electric field communication system according to claim 14, wherein the sensor is a sensor that detects a surrounding environment of the component, and the processing unit detects whether the component is in an appropriate operating environment, based on the surrounding environment of the component detected by the sensor.

17. The electric field communication system according to claim 1, wherein the first transmitter is disposed between and in contact with the earth ground and the communication medium, and the second electrode of the first transmitter is disposed on a side of the earth ground.

* * * * *